(12) United States Patent
Nagano et al.

(10) Patent No.: US 8,401,340 B2
(45) Date of Patent: Mar. 19, 2013

(54) IMAGE PROCESSING APPARATUS AND COEFFICIENT LEARNING APPARATUS

(75) Inventors: Takahiro Nagano, Kanagawa (JP); Yasuhiro Suto, Tokyo (JP); Noriaki Takahashi, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 748 days.

(21) Appl. No.: 12/567,146

(22) Filed: Sep. 25, 2009

(65) Prior Publication Data

US 2010/0080451 A1 Apr. 1, 2010

(30) Foreign Application Priority Data

Sep. 29, 2008 (JP) ................. P2008-250229

(51) Int. Cl.
*G06K 9/32* (2006.01)
*H04B 1/66* (2006.01)
*H04N 5/765* (2006.01)

(52) U.S. Cl. .......... 382/299; 375/240; 386/232

(58) Field of Classification Search .......... 382/162, 382/167, 199, 205, 260–275, 299, 300; 708/290; 348/441–459; 345/606–610, 698, 699; 375/240–241; 386/232, 233
See application file for complete search history.

(56) References Cited

U.S. PATENT DOCUMENTS

| | | | | |
|---|---|---|---|---|
| 5,555,465 A | * | 9/1996 | Kondo | 348/571 |
| 5,666,164 A | * | 9/1997 | Kondo et al. | 348/441 |
| 5,764,305 A | * | 6/1998 | Kondo | 348/571 |
| 5,852,470 A | * | 12/1998 | Kondo et al. | 348/448 |
| 5,940,132 A | * | 8/1999 | Kondo et al. | 348/441 |
| 6,657,677 B1 | * | 12/2003 | He et al. | 348/625 |
| 6,714,252 B2 | * | 3/2004 | Kondo et al. | 348/458 |
| 7,031,513 B1 | * | 4/2006 | Kondo | 382/155 |
| 7,447,378 B2 | * | 11/2008 | Kondo et al. | 382/266 |
| 7,747,069 B2 | * | 6/2010 | Kondo | 382/155 |
| 2002/0027611 A1 | * | 3/2002 | Kondo et al. | 348/458 |
| 2002/0181763 A1 | * | 12/2002 | Kondo et al. | 382/154 |
| 2006/0126930 A1 | * | 6/2006 | Kondo | 382/155 |
| 2009/0028465 A1 | * | 1/2009 | Pan | 382/300 |
| 2009/0074319 A1 | * | 3/2009 | Pan et al. | 382/261 |
| 2009/0285472 A1 | * | 11/2009 | Kondo | 382/155 |
| 2010/0080451 A1 | * | 4/2010 | Nagano et al. | 382/159 |
| 2010/0080452 A1 | * | 4/2010 | Nagano et al. | 382/159 |

FOREIGN PATENT DOCUMENTS

JP 7-79418 3/1995

* cited by examiner

*Primary Examiner* — Aaron W Carter
(74) *Attorney, Agent, or Firm* — Oblon, Spivak, McClelland, Maier & Neustadt, L.L.P.

(57) ABSTRACT

An image processing apparatus includes a storage unit in which regression coefficient data is stored for each class on the basis of a tap in which a linear feature amount corresponding to a pixel of interest of first image data and a non-linear feature amount determined from the image data are used as elements; a classification unit configured to classify each of linear feature amounts of a plurality of items of input data of the input first image into a predetermined class; a reading unit configured to read the regression coefficient data; and a data generation unit configured to generate data of a second image obtained by making the first image have higher quality by performing a product-sum computation process by using the regression coefficient data read from the reading unit and elements of the tap of each of the plurality of items of input data of the input first image.

6 Claims, 19 Drawing Sheets

PHASE OF TEACHER IMAGE $t_i$ $$x_{i12}^{(h)} = -x_{i5} - 2 \cdot x_{i11} - x_{i17}$$
$$+ x_{i7} + 2 \cdot x_{i19} + x_{i13}$$

IMAGE PROCESSING APPARATUS AND COEFFICIENT LEARNING APPARATUS

BACKGROUND OF THE INVENTION

1. Field of the Invention

The present invention relates to an image processing apparatus and a coefficient learning apparatus and, more particularly, relates to an image processing apparatus and a coefficient learning apparatus that are capable of more appropriately recognizing a feature amount of an image for which a high-quality image forming process is to be performed.

2. Description of the Related Art

In predicting a teacher image from a student (input) image containing deterioration, processing thereof by using one model in which the entire image is represented by a linear sum of student (input) images has a problem in accuracy. For this reason, a method is performed in which student (input) images are classified in accordance with a local feature amount, and a regression coefficient is switched for each class. Hitherto, methods that use 1-bit ADRC or a K-means algorithm for classification have been proposed.

For example, in order to convert a standard television signal (SD signal) into a high-resolution signal (HD signal), a technique using a classification adaptive process has been proposed (see, for example, Japanese Unexamined Patent Application Publication No. 7-79418).

In a case where an SD signal is converted into an HD signal by using the technology of Japanese Unexamined Patent Application Publication No. 7-79418, first, the feature of a class tap formed from an input SD signal is determined using ADRC (adaptive dynamic range coding) or the like, and classification is performed on the basis of the feature of the obtained class tap. Then, by performing computation between a prediction coefficient provided for each class and a prediction tap formed from the input SD signal, an HD signal is obtained.

Classification is designed such that high S/N pixels are grouped on the basis of a pattern of pixel values of low S/N pixels, which are at positions close in terms of space or time to the positions of the low S/N image, which correspond to the positions of the high S/N pixels, for which a prediction value is determined. The adaptive process is such that a prediction coefficient more appropriate for high S/N pixels belonging to a group is determined for each group (corresponding to the above-described class), and the image quality is improved on the basis of the prediction coefficient. Therefore, it is preferable that classification be performed in such a manner that, basically, class taps are formed using many more pixels, which are related to high S/N pixels for which a prediction value is determined.

SUMMARY OF THE INVENTION

However, for example, in a method in which pixels are grouped according to a pattern of pixel values as in Japanese Unexamined Patent Application Publication No. 7-79418, classification becomes uniform. For this reason, depending on the degree of the deterioration of image quality and the position of a pixel of interest, classification may appropriately not be performed. The technology of Japanese Unexamined Patent Application Publication No. 7-79418 is designed to compute the pixel values of an image formed to have higher quality by using a prediction coefficient appropriate for a class recognized by classification. Thus, if it is difficult to appropriately perform classification, it is difficult to compute appropriate pixel values.

There is a concern about a limitation of a high-quality image forming process based on classification in which only linear feature amounts of patterns of pixel values are used.

It is desirable to be able to more optimally recognize feature amounts of an image for which a high-quality image forming process is performed.

According to an embodiment of the present invention, there is provided an image processing apparatus including: storage means in which regression coefficient data is stored for each class on the basis of a tap in which a linear feature amount corresponding to a pixel of interest of first image data and a non-linear feature amount determined from the image data are used as elements; classification means for classifying each of linear feature amounts of a plurality of items of input data of the input first image into a predetermined class; reading means for reading, from the storage means, the regression coefficient data corresponding to the class determined by the classification means; and data generation means for generating data of a second image obtained by making the first image have higher quality by performing a product-sum computation process by using the regression coefficient data read from the reading means and elements of the tap of each of the plurality of items of input data of the input first image.

The non-linear feature amounts may be horizontal and vertical differentiation absolute values at the positions of pixels in the surroundings of the pixel of interest.

The non-linear feature amounts may be maximum and minimum values of the pixels in the surroundings of the pixel of interest.

The non-linear feature amounts may be maximum values of the horizontal and vertical differentiation absolute values at the positions of pixels in the surroundings of the pixel of interest.

The image processing apparatus may further include: discrimination prediction means for performing discrimination prediction computation that obtains a discrimination prediction value for identifying a discrimination class to which the pixel of interest belongs through a product-sum computation of each of the linear feature amounts corresponding to the pixel of interest of the first image data and a prestored discrimination coefficient, wherein, on the basis of the discrimination prediction value, the classification means classifies each of the pixels of interest of the image of the first signal into a predetermined class.

In an embodiment of the present invention, regression coefficient data is stored for each class is stored on the basis of a tap in which a linear feature amount corresponding to a pixel of interest of first image data and a non-linear feature amount determined from the image data are used as elements. Each of linear feature amounts of a plurality of items of input data of the input first image is classified into a predetermined class. The regression coefficient data corresponding to the class determined by the classification means is read from the storage means. Data of a second image obtained is generated by making the first image have higher quality by performing a product-sum computation process by using the regression coefficient data read from the reading means and elements of the tap of each of the plurality of items of input data of the input first image.

According to another embodiment of the present invention, there is provided a coefficient learning apparatus including: classification means for classifying each of the linear feature amounts corresponding to the pixels of interest of a plurality of items of input data of a first image obtained by changing the quality of a second image to a predetermined class; regression coefficient calculation means for calculating a regression coefficient for a product-sum computation using a regression coefficient a tap in which linear feature amounts of the plurality of items of input data of the first image and non-linear feature amounts determined from the plurality of items of input data are used as elements, the product-sum computation being a product-sum computation for obtaining pixel values of the second image for each class determined by the classification means; and storage means for storing the calculated regression coefficient for each classified class.

The non-linear feature amounts may be horizontal and vertical differentiation absolute values at the positions of pixels in the surroundings of the pixel of interest.

The non-linear feature amounts may be maximum and minimum values of the pixels in the surroundings of the pixel of interest.

The non-linear feature amounts may be maximum values of the horizontal and vertical differentiation absolute values at the positions of pixels in the surroundings of the pixel of interest.

The coefficient learning apparatus may further include: discrimination prediction means for performing discrimination prediction computation that obtains a discrimination prediction value for identifying a discrimination class to which the pixel of interest belongs through a product-sum computation of each of the linear feature amounts corresponding to the pixels of interest of the first image data and a prestored discrimination coefficient, wherein the classification means classifies, on the basis of the discrimination prediction value, each of the pixels of interest of the image of the first signal into a predetermined class.

In an embodiment of the present invention, each of the linear feature amounts corresponding to the pixels of interest of a plurality of items of input data of a first image obtained by changing the quality of a second image is classified to a predetermined class. A regression coefficient for a product-sum computation using a tap in which linear feature amounts of the plurality of items of input data of the first image and non-linear feature amounts determined from the plurality of items of input data are used as elements is calculated, the product-sum computation being a product-sum computation for obtaining pixel values of the second image for each class determined by the classification means. The calculated regression coefficient is stored for each classified class.

According to the embodiment of the present invention, it is possible to more optimally recognize feature amounts of an image for which a high-quality image forming process is performed.

DESCRIPTION OF THE PREFERRED EMBODIMENTS

Embodiments according to the present invention will be described below with reference to the drawings.

Figure 1:
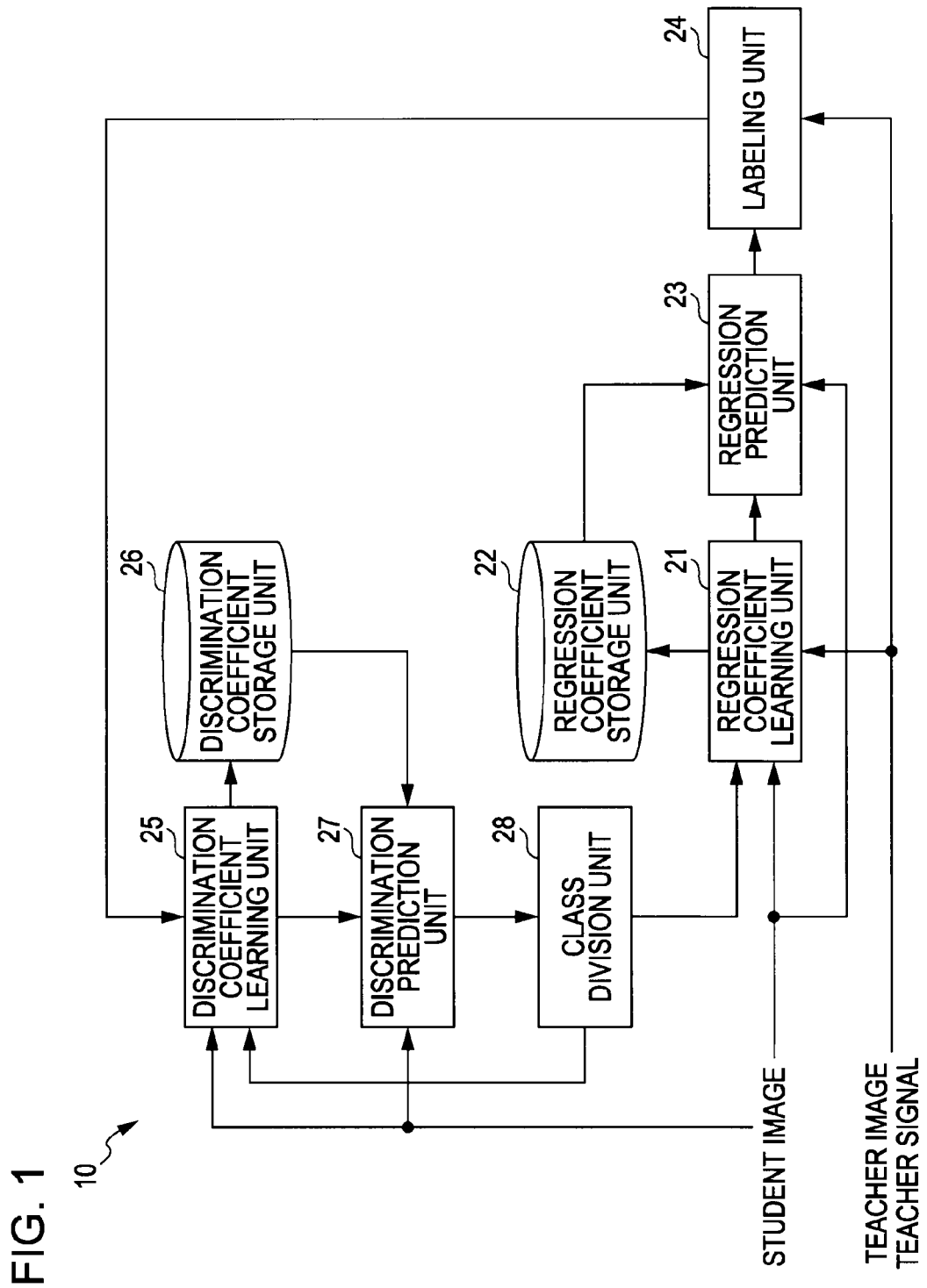
FIG. 1 is a block diagram showing an example of the configuration of a learning apparatus according to an embodiment of the present invention.

FIG. 1 is a block diagram showing an example of the configuration of a learning apparatus 10 according to an embodiment of the present invention.

The learning apparatus 10 is formed as a learning apparatus for use for a high-quality image forming process, and generates a coefficient used for a high-quality image forming process on the basis of data of an input student image and teacher image (or a teacher signal). Here, examples of the high-quality image forming process include a process for generating a noise-removed image from a noise-containing image, a process for generating an image without blur from an image with blur, a process for generating a high-resolution image from a low-resolution image, and a process for solving those multiple problems.

The learning apparatus 10 is formed to use a student image as an input image and learn a regression coefficient, which is a coefficient for generating an image of high quality close to a teacher image as an output image. Although details will be described later, the regression coefficient is set as a coefficient used for a linear primary expression in which a feature amount obtained from the values of the plurality of pixels corresponding to the pixel of interest of the input image is used as a parameter, and the value of the pixel corresponding to the pixel of interest in the image formed to have higher quality is computed. The regression coefficient is learnt for each class number to be described later.

Furthermore, on the basis of the plurality of pixel values corresponding to the pixel of interest of the input image and the feature amount obtained from those pixel values, the learning apparatus 10 classifies the pixel of interest into one of a plurality of classes. That is, the learning apparatus 10 learns a discrimination coefficient used to identify which class for a high-quality image forming process each of the pixels of interest of the input image belongs to. Although details will be described later, the discrimination coefficient is set as a coefficient for use with a linear primary expression in which a feature amount obtained from the values of the plurality of pixels corresponding to the pixel of interest of the input image is used as a parameter.

That is, by repeatedly performing a computation of a linear primary expression in which a plurality of pixel values corresponding to the pixel of interest of the input image and the feature amount obtained from those pixel values are made parameters by using the discrimination coefficient learnt by the learning apparatus 10, a class for the high-quality image forming process is identified. Then, by performing a linear primary expression in which a plurality of pixel values corresponding to the pixel of interest of the input image and the feature amount obtained from those pixel values are used as parameters by using a regression coefficient corresponding to the identified class, the pixel values of the image formed to have higher quality are computed.

In the learning apparatus 10, for example, a noise-free image is input as a teacher image, and an image in which noise is added to the teacher image is input as a student image.

The data of the student image is supplied to a regression coefficient learning apparatus 21, a regression prediction unit 23, a discrimination coefficient learning apparatus 25, and a discrimination prediction unit 27.

The regression coefficient learning apparatus 21 sets a predetermined pixel from among the pixels forming the student image as a pixel of interest. Then, on the basis of the pixel of interest of the student image and the surrounding pixel values, the regression coefficient learning apparatus 21 learns a coefficient of a regression prediction computation expression for predicting pixel values of the teacher image corresponding to the pixel of interest using a least squares method.

If the pixel value of the teacher image is denoted as $t_i$ (i=1, 2, ... N) and the prediction value as $y_i$ (i=1, 2, ... N), Expression (1) holds, where N represents the number of all the samples of the pixels of the student image and the pixels of the teacher image.

$$t_i = y_i \epsilon_i \quad (1)$$

where $\epsilon_i$ (i=1, 2, ... N) is an error term.

If a linear model in which a regression coefficient w is used is assumed, the prediction value $y_i$ can be represented as Expression (2) by using a pixel value $x_{ij}$ (i=1, 2, ... N, j=1, 2, ... M) of the student image.

$$y_i = w_0 + \sum_{j=1}^{M} w_j x_{ij} = w_0 + w^T x_i \quad (2)$$

where $x_i = (x_{i1}, x_{i2}, \ldots, x_{iM})^T$, $w = (w_1, w_2, \ldots, w_M)^T$.

$w^T$ represents a transposition matrix of represented w, which is expressed as a matrix expression. $w_o$ is a bias parameter and is a constant term. The value of M corresponds to the number of elements of a tap (to be described later).

In Expression (2), $x_i$ used as a parameter is a vector in which each of the values of the pixels at a predetermined position, with the pixel of interest of the student image being the center, is an element. Hereinafter, in Expression (2), $x_i$ used as a parameter will be referred to as a tap.

Figure 2:
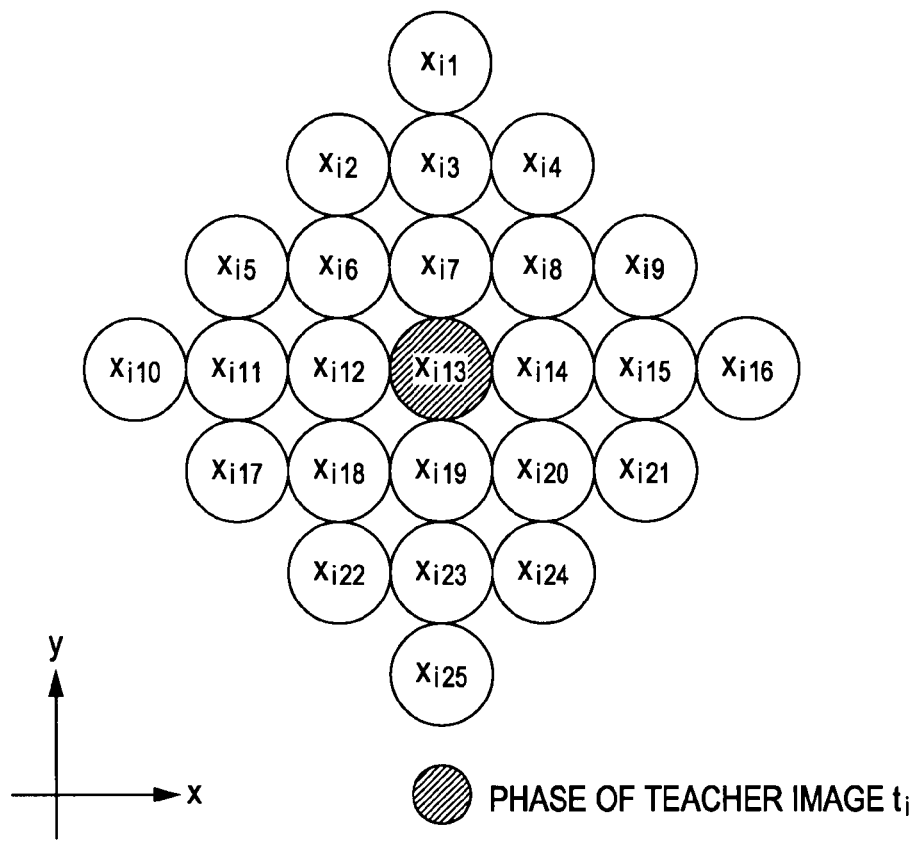
FIG. 2 shows an example of pixels serving as elements of a tap.

FIG. 2 shows an example of pixels serving as elements of a tap. FIG. 2 is a two-dimensional diagram in which the horizontal direction is plotted along the x axis and the vertical direction is plotted along the y axis, with a tap being formed of 25 pixels ($x_{i1}$ to $x_{i25}$) in the surroundings of the pixel of interest. In this case, the pixel of interest is the pixel of $x_{i13}$, and the position of the pixel of $x_{i13}$ corresponds to the position (phase) of the pixel of the teacher image predicted in accordance with Expression (2).

The regression coefficient learning apparatus 22 learns the coefficient w and the bias parameter $w_o$ of Expression (2) and stores them in the regression coefficient storage unit 22.

In the foregoing, an example in which a tap is formed using the values of the 25 pixels ($x_{i1}$ to $x_{i25}$) in the surroundings of the pixel of interest has been described. In this case, the tap is formed using a linear feature amount obtained from the student image.

However, by causing a non-linear feature amount obtained from the student image to be contained in the tap, it is possible to further increase the accuracy of prediction. Examples of non-linear feature amounts obtained from a student image include horizontal differentiation absolute values and vertical differentiation absolute values of pixel values in the surroundings of the pixel of interest.

Examples of expressions used for computations of horizontal differentiation absolute values and the vertical differentiation absolute values of pixel values in the surroundings of the pixel of interest are shown in Expressions (3).

$$|x_{ij}^{(h)}| = |\text{Sobel}_j^{(h)}\{x_i\}|$$

$$|x_{ij}^{(v)}| = |\text{Sobel}_j^{(v)}\{x_i\}| \quad (3)$$

For the computations of the horizontal differentiation absolute value and the vertical differentiation absolute value in Expressions (3), Sobel operators are used. By performing a filter process shown in FIG. 3 with the pixel of interest represented by $x_{ij}$, the horizontal differentiation absolute value and the vertical differentiation absolute value are determined.

Figure 3:
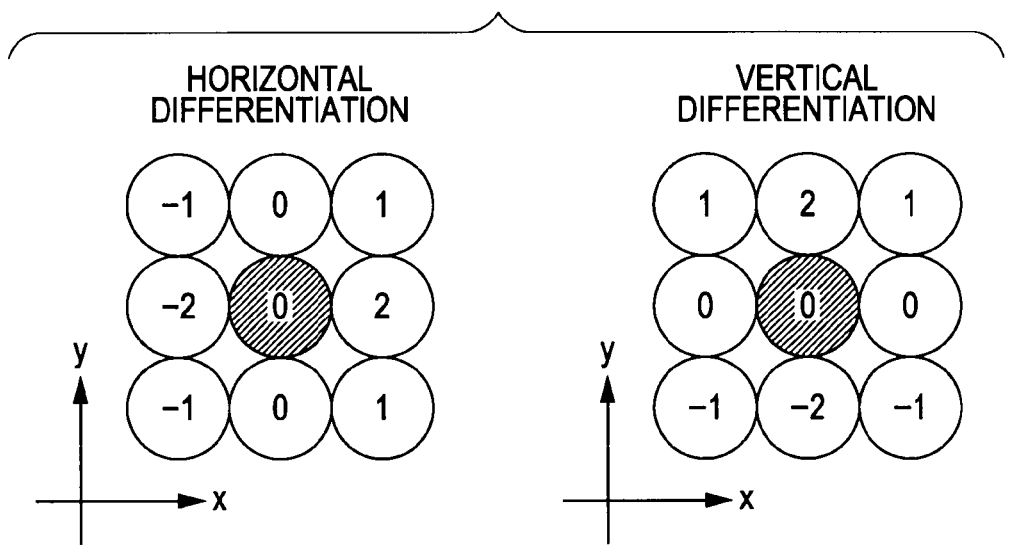
FIG. 3 shows an example of a filter for use for computations of horizontal differentiation absolute values and vertical differentiation absolute values.

FIG. 3 is a two-dimensional diagram in which the horizontal direction is plotted along the x axis and the vertical direction is plotted along the y axis, also showing a filter in which each of nine pixels in the surroundings of the pixel of interest is a target. The numerical values shown in portions indicated using circles are multiplied by the pixel values at the respective positions.

Figure 4:
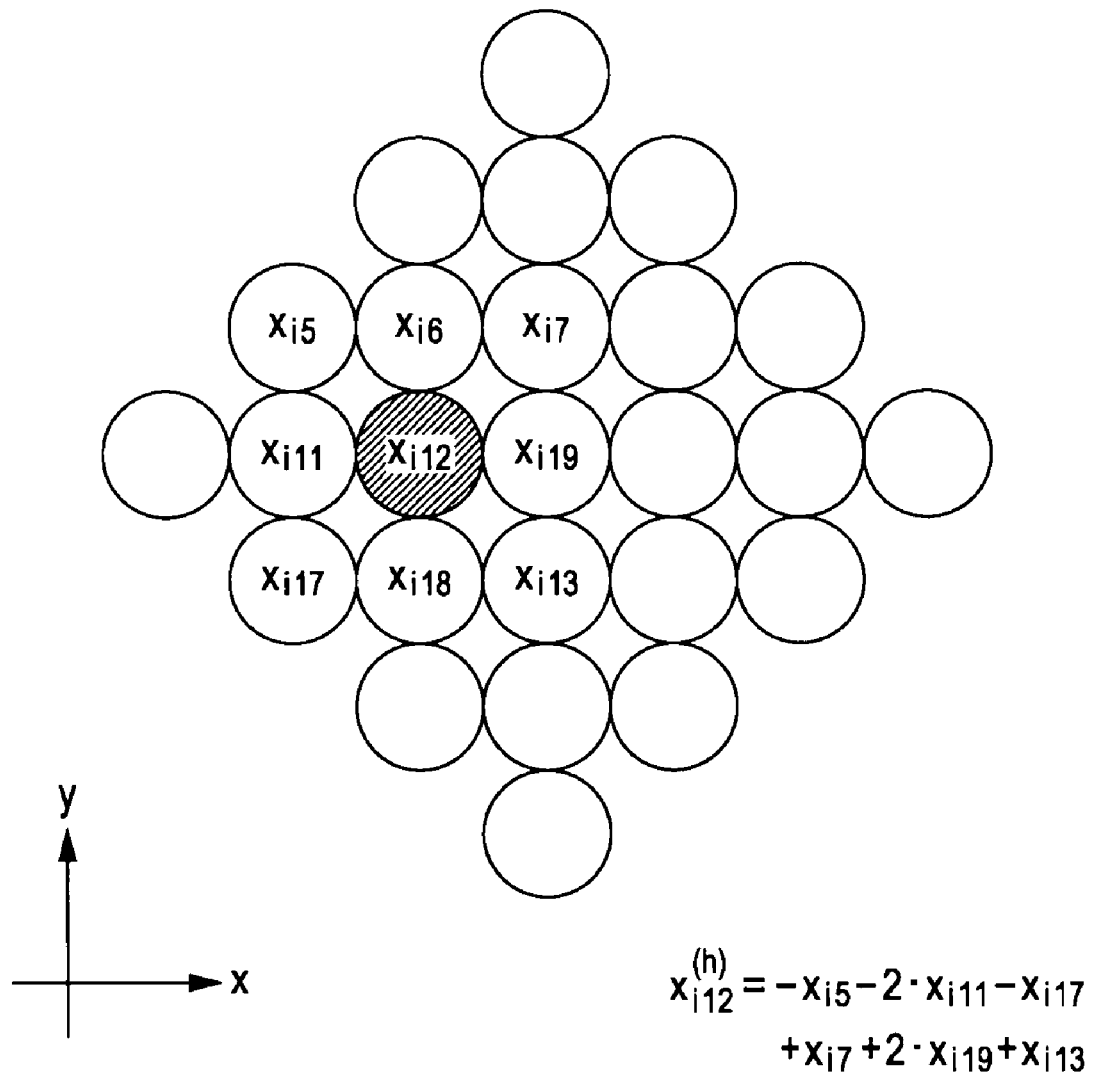
FIG. 4 illustrates an example of computation of horizontal differentiated values.

FIG. 4 illustrates an example of a computation of a horizontal differentiated value. In the example of FIG. 4, an example of a computation of a filter process in which a pixel denoted as $x_{i12}$ and each of the nine pixels in the surroundings of that pixel are targets is shown. In FIG. 4, values, such as $x_{i12}$, assigned to the respective pixels shown using circles directly represent the pixel values.

In a case where a horizontal differentiation absolute value and a vertical differentiation absolute value are to be determined in accordance with Expressions (3), horizontal differentiation absolute values and vertical differentiation absolute values corresponding to the respective M pixels with the pixel of interest being at the center will be determined. For example, in a case where, as shown in FIG. 2, the pixel of interest and the surrounding 25 pixels are contained in the tap, since the value of M becomes 25, 25 horizontal differentiation absolute values and 25 vertical differentiation absolute values are determined with respect to one pixel of interest.

Furthermore, examples of non-linear feature amounts obtained from the student image include the maximum value and the minimum value of the pixel values in the surroundings of the pixel of interest, and the maximum value of the horizontal differentiation absolute values and the maximum value of the vertical differentiation absolute values. The maximum value and the minimum value of the pixel values in the surroundings of the pixel of interest, the maximum value of the horizontal differentiation absolute values, and the maximum value of the vertical differentiation absolute values can be determined in accordance with Expressions (4).

$$x_i^{(max)} = \max_{1 \leq j \leq L} x_{ij}$$
$$x_i^{(min)} = \min_{1 \leq j \leq L} x_{ij}$$
$$|x_i^{(h)}|^{max} = \max_{1 \leq j \leq L} |x_{ij}^{(h)}|$$
$$|x_i^{(v)}|^{min} = \max_{1 \leq j \leq L} |x_{ij}^{(v)}|$$
(4)

where L is the number of surrounding pixel values $\leq M$.

As described above, by causing a non-linear feature amount obtained from the student image to be contained in the tap, it is possible to further improve the accuracy of prediction. Although details will be described later, for example, in a case where pixel values of a noise-free image are to be predicted on the basis of an input noise-containing image, by causing a non-linear feature amount obtained from the student image to be contained in the tap, the S/N ratio of the image can be improved from 0.3 to 0.5 dB (decibel).

In a case where a coefficient of a regression prediction computation expression is to be learnt using a least squares method, a prediction value determined using the tap formed as described above is substituted in Expression (1), and a squared sum for all the samples of the error term of Expression (1) is computed in accordance with Expression (5).

$$E = \sum_{i=1}^{N}(t_i - y_i)^2 = \sum_{i=1}^{N}\varepsilon_i^2$$
(5)

Then, a regression coefficient with which the squared sum E for all the samples of the error term of Expression (5) is minimized is calculated in the following manner.

$$w = (S^{(xx)})^{-1}S^{(xt)}$$
(6)

$S^{(xx)}$ and $S^{(xt)}$ of Expression (6) are a matrix and a vector in which the variance and covariance of the student image and the teacher image are elements, respectively, and each element can be determined in accordance with Expressions (7).

$$S_{jk}^{(xx)} = \frac{1}{N-1}\sum_{i=1}^{N}(x_{ij} - \bar{x}_j)(x_{ik} - \bar{x}_k)$$
(7)

-continued
$$S_j^{(xt)} = \frac{1}{N-1}\sum_{i=1}^{N}(x_{ij} - \bar{x}_j)(t_i - \bar{t})$$

$(j, k = 1, 2, \ldots, M)$ $\bar{x}_j$ and $\bar{t}$ are averages of the student image and the teacher image, respectively, and can be represented on the basis of the following Expression (8).

$$\bar{x}_j = \frac{1}{N}\sum_{i=1}^{N}x_{ij}$$
$$\bar{t} = \frac{1}{N}\sum_{i=1}^{N}t_i$$
(8)

Furthermore, the bias parameter $w_o$ of Expression (2) can be determined as shown in Expression (9) by using Expression (6).

$$w_0 = \bar{t} - w^T\bar{x}$$
(9)

It is also possible for the bias parameter $w_o$, which is a constant term in Expression (2), not to be contained therein.

The coefficient w obtained in the manner described above is a vector of the same number of elements as the above-described number of elements of the tap. The coefficient w obtained by the regression coefficient learning apparatus 21 is a coefficient used for a computation for predicting the pixel values of an image formed to have higher quality by regression prediction, and will be referred to as a regression coefficient w. The bias parameter $w_o$ is assumed to be a regression coefficient in a wide sense, and is stored in such a manner as to be associated with the regression coefficient w as necessary.

For example, as shown in FIG. 2, in a case where a tap is formed using only the linear feature amount obtained from a student image, the number of elements of the tap is 25, and the number of elements of the vector of the regression coefficient w is also 25. Furthermore, in a case where the linear feature amount obtained from the student image shown in FIG. 2, to which the horizontal differentiation absolute values and the vertical differentiation absolute values of the pixel values in the surroundings of the pixel of interest, which are obtained on the basis of Expressions (3), are added as non-linear feature amounts, is to be used as a tap, the number of elements of the tap is 75 (=25+25+25). Therefore, the number of elements of the vector of the regression coefficient w is 75. Furthermore, in a case where the linear feature amount to which the maximum value and the minimum value of the pixel values in the surroundings of the pixel of interest, and the maximum value of the horizontal differentiation absolute values and the maximum value of the vertical differentiation absolute values, which are obtained on the basis of Expressions (4), are added as non-linear feature amounts, is to be used as a tap, the number of elements of the tap is 79 (=25+25+25+2+2). Thus, the number of elements of the vector of the regression coefficient w is 79.

Referring back to FIG. 1, the regression coefficient w obtained by the regression coefficient learning apparatus 21 is stored in the regression coefficient storage unit 22.

The regression prediction unit 23 sets a predetermined pixel from among the pixels forming the student image as a pixel of interest. Then, the regression prediction unit 23 obtains a tap formed of the pixel of interest and the surrounding pixel values, which are described above with reference to FIG. 2; a tap formed of the pixel of interest of FIG. 2 and the surrounding pixel values, and the horizontal differentiation absolute values and the vertical differentiation absolute values of the pixel values in the surroundings of the pixel of interest, which are determined on the basis of Expressions (3); and a tap formed of the values of the pixel of interest of FIG. 2 and the surrounding pixels, the horizontal differentiation absolute values and the vertical differentiation absolute values of the pixel values in the surroundings of the pixel of interest, which are determined on the basis of Expressions (3), the maximum value and the minimum value of the pixel values in the surroundings of the pixel of interest, which are determined on the basis of Expressions (4), and the maximum value of the horizontal differentiation absolute values and the maximum value of the vertical differentiation absolute values.

The regression prediction unit 23 substitutes the tap and the regression coefficient w (including the bias parameter $w_o$ as necessary) in Expression (2) and computes a prediction value $y_i$.

The labeling unit 24 compares the prediction value $y_i$ computed by the regression prediction unit 23 with a true value $t_i$, which is the pixel value of the teacher image. For example, the labeling unit 24 labels the pixel of interest for which the prediction value $y_i$ has become greater than or equal to the true value $t_i$ as a discrimination class A, and labels the pixel of interest for which the prediction value $y_i$ has become less than the true value $t_i$ as a discrimination class B. That is, on the basis of the computation result of the regression prediction unit 23, the labeling unit 24 classifies each pixel of the student image into the discrimination class A or the discrimination class B.

Figure 5:
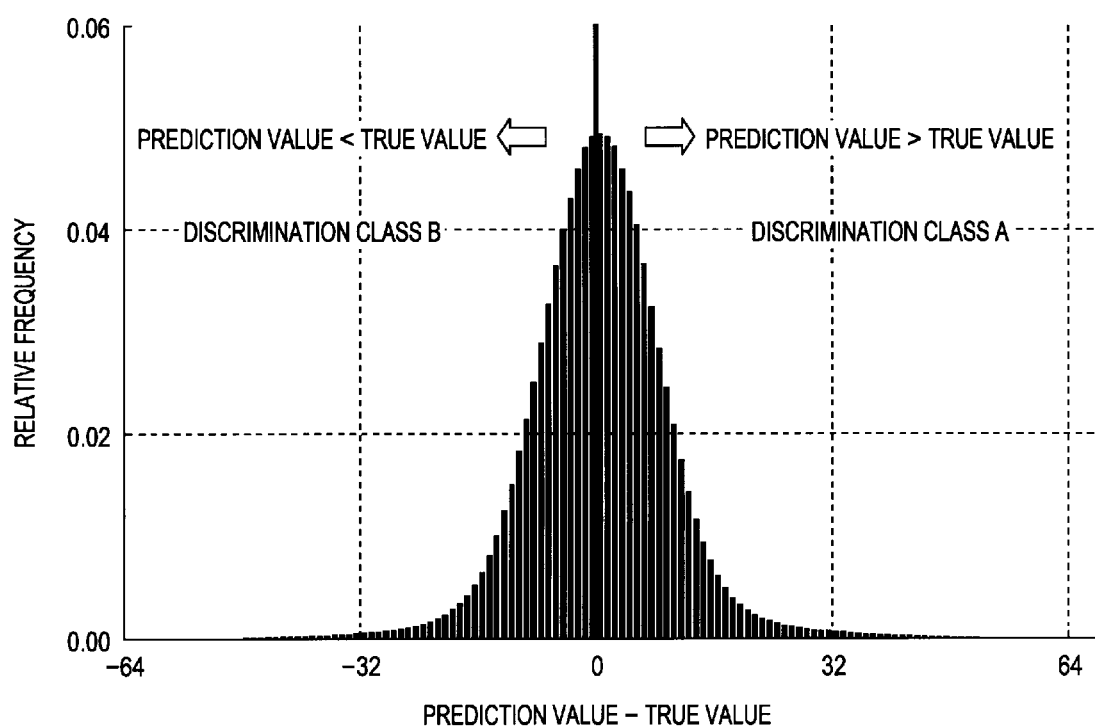
FIG. 5 is a histogram illustrating processing of a labeling unit of FIG. 1.

FIG. 5 is a histogram illustrating the process of the labeling unit 24. The horizontal axis of FIG. 5 indicates a difference value obtained by subtracting the true value $t_i$ from the prediction value $y_i$, and the vertical axis represents the relative frequency of samples (combination of the pixels of the teacher image and the pixels of the student image) at which the difference value is obtained.

As shown in FIG. 5, as a result of the computation of the regression prediction unit 23, the frequency of the samples at which the difference value obtained by subtracting the true value $t_i$ from the prediction value $y_i$ becomes 0 is highest. In the case that the difference value is 0, an accurate prediction value (=true value) has been computed by the regression prediction unit 23, and the high-quality image forming process has been appropriately performed. That is, since the regression coefficient w has been learnt by the regression coefficient learning apparatus 21, the probability that an accurate prediction value is computed on the basis of Expression (2) is high.

However, regarding samples in which the difference value is not 0, an accurate regression prediction has not been performed. In that case, it is considered that there is a room for learning a more appropriate regression coefficient w.

In the embodiment of the present invention, for example, it is assumed that if the regression coefficient w is learnt by targeting only the pixel of interest for which the prediction value $y_i$ has become greater than or equal to the true value $t_i$, it is possible to learn a more appropriate regression coefficient w with respect to those pixels of interest. Also, it is assumed that if the regression coefficient w is learnt by targeting only the pixel of interest for which the prediction value $y_i$ has become less than the true value $t_i$, it is possible to learn a more appropriate regression coefficient w with respect to those pixels of interest. For this reason, on the basis of the computation result of the regression prediction unit 23, the labeling unit 24 classifies each pixel of the student image into the discrimination class A or the discrimination class B.

After that, the process of the discrimination coefficient learning apparatus 25 allows learning of a coefficient for use for prediction computation for classifying each pixel into the discrimination class A or the discrimination class B on the basis of the pixel value of the student image. That is, in the embodiment of the present invention, it is made possible that even if the true value is unclear, each pixel can be classified into the discrimination class A or the discrimination class B on the basis of the pixel value of the input image.

It has been described thus far that the labeling unit 24 labels each pixel of the student image. The unit of the labeling is such that labeling is performed one by one for each tap (vector containing the pixel values in the surroundings of the pixel of interest and the non-linear feature amount) of the student image corresponding to the true value $t_i$, which is, to be accurate, the pixel value of the teacher image.

Here, an example has been described in which the pixel of interest for which the prediction value $y_i$ has become greater than or equal to the true value $t_i$ and the pixel of interest for which the prediction value $y_i$ has become less than the true value $t_i$ are discriminated and labeled. Alternatively, labeling may be performed by another method. For example, the pixel of interest for which the differentiation absolute value between the prediction value $y_i$ and the true value $t_i$ has become a value less than a preset threshold value may be labeled as the discrimination class A, and the pixel of interest for which the differentiation absolute value between the prediction value $y_i$ and the true value $t_i$ has become a value greater than or equal to the preset threshold value may be labeled as the discrimination class B. Furthermore, the pixel of interest may be labeled as the discrimination class A or the discrimination class B by using a method other than that. In the following, a description will be given of an example in which the pixel of interest for which the prediction value $y_i$ has become greater than or equal to the true value $t_i$ and the pixel of interest for which the prediction value $y_i$ has become less than the true value $t_i$ are discriminated and labeled.

Referring back to FIG. 1, the discrimination coefficient learning apparatus 25 sets a predetermined pixel from among the pixels forming the student image as a pixel of interest. Then, the discrimination coefficient learning apparatus 25 learns a coefficient used for computing a prediction value for making a determination as to the discrimination class A and the discrimination class B on the basis of the values of the pixel of interest of the student image and the surrounding pixels by using, for example, a least squares method.

In the learning of a discrimination coefficient, it is assumed that a prediction value $y_i$ for making a determination as to the discrimination class A and the discrimination class B on the basis of the values of the pixel of interest of the student image and the surrounding pixels thereof is determined in accordance with Expression (10).

$$y_i = z_0 + \sum_{j=1}^{M} z_j x_{ij} = z_0 + z^T x_i \qquad (10)$$

where $x_i=(x_{i1}, x_{i2}, \ldots, x_{iM})^T$, $z=(z_1, z_2, \ldots, z_M)^T$.

$z^t$ represents a transposition matrix represented as a matrix determinant expression. $z_o$ is a bias parameter and is a constant term. The value of M corresponds to the number of elements of the tap.

Similarly to the case of Expression (2), in Expression (10), $x_i$ used as a parameter will be referred to as a tap. The tap in the learning of the discrimination coefficient is the same as the tap in the learning of the regression coefficient. That is, the tap is formed as a tap formed of the values of the pixel of interest and the surrounding pixels, which are described above with reference to FIG. 2; a tap formed of the values of the pixel of interest and the surrounding pixels of FIG. 2, and the horizontal differentiation absolute values and the vertical differentiation absolute values of the pixel values in the surroundings of the pixel of interest, which are determined on the basis of Expressions (3); or a tap formed of the values of the pixel of interest and the surrounding pixels of FIG. 2, the horizontal differentiation absolute values and the vertical differentiation absolute values of the pixel values in the surroundings of the pixel of interest, which are determined on the basis of Expressions (3), the maximum value and the minimum value of the pixel values in the surroundings of the pixel of interest, which are determined on the basis of Expressions (4), the maximum value of the horizontal differentiation absolute values, and the maximum value of the vertical differentiation absolute values.

The discrimination coefficient learning apparatus 25 learns the coefficient z and the bias parameter $z_o$ of Expression (10) and stores them in the discrimination coefficient storage unit 26.

In a case where the coefficient of the discrimination prediction computation expression is to be learnt by using a least squares method, the prediction value determined using the tap formed in the manner described above is substituted in Expression (1), and the squared sum for all the samples of the error term of Expression (1) is computed in accordance with Expression (11).

$$z = (S^{(AB)})^{-1} (\bar{x}^{(A)} - \bar{x}^{(B)}) \quad (11)$$

$S^{(AB)}$ of Expression (11) is a matrix in which the values determined on the basis of Expression (12) are elements.

$$S_{jk}^{(AB)} = \frac{(N_A - 1) S_{jk}^{(A)} + (N_B - 1) S_{jk}^{(B)}}{N_A + N_B - 2} \quad (12)$$

where (j, k=1, 2, . . . , M).

$N_A$ and $N_B$ of Expression (12) denote the total number of samples belonging to the discrimination class A and the discrimination class B, respectively.

Furthermore, $S_A^{jk}$ and $S_B^{jk}$ of Expression (12) denote the variance and covariance values determined using the samples (taps) belonging to the discrimination class A and the discrimination class B, respectively, and are determined on the basis of Expressions (13).

$$S_{jk}^{(A)} = \frac{1}{N_A - 1} \sum_{i \in A} (x_{ij}^{(A)} - \bar{x}_j^{(A)})(x_{ik}^{(A)} - \bar{x}_k^{(A)}) \quad (13)$$

$$S_{jk}^{(B)} = \frac{1}{N_B - 1} \sum_{i \in B} (x_{ij}^{(B)} - \bar{x}_j^{(B)})(x_{ik}^{(B)} - \bar{x}_k^{(B)})$$

where (j, k=1, 2, . . . , M) and $\bar{x}_j^{(A)}$ and $\bar{x}_j^{(B)}$ are average values determined using samples belonging to the discrimination class A and the discrimination class B, respectively, and can be obtained on the basis of Expressions (14).

$$\bar{x}_j^{(A)} = \frac{1}{N_A} \sum_{i \in A} x_{ij}^{(A)} \quad (14)$$

$$\bar{x}_j^{(B)} = \frac{1}{N_B} \sum_{i \in B}^{N} x_{ij}^{(B)}$$

where (j, k=1, 2, . . . , M)

$$\bar{x}^{(A)} = (\bar{x}_1^{(A)}, \bar{x}_2^{(A)}, \ldots, \bar{x}_M^{(A)}), \bar{x}^{(B)} = (\bar{x}_1^{(B)}, \bar{x}_2^{(B)}, \ldots, \bar{x}_M^{(B)}).$$

The bias parameter $z_o$ of Expression (10) can be determined as shown in Expression (15) by using Expression (11).

$$z_0 = -\frac{1}{2} z^T (\bar{x}^{(A)} + \bar{x}^{(B)}) \quad (15)$$

It is also possible that the bias parameter $z_o$, which is a constant term in Expression (15), is not contained.

The coefficient z obtained in the manner described above is a vector having the same number of elements as the number of elements of the tap. The coefficient z obtained by the discrimination coefficient learning apparatus 25 is a coefficient used for computation for predicting which one of the discrimination class A and the discrimination class 2 the predetermined pixel of interest belongs to, and will be referred to as a discrimination coefficient z. The bias parameter $z_o$ is assumed to be a discrimination coefficient in a wide sense, and is assumed to be stored in such a manner as to be associated with the discrimination coefficient z as necessary.

For example, as shown in FIG. 2, in a case where a tap is formed of the linear feature amount obtained from the student image, the number of elements of the tap is 25, and the number of elements of the vector of the discrimination coefficient z is 25. Furthermore, in a case where the linear feature amount obtained from the student image, which is shown in FIG. 2, to which the horizontal differentiation absolute values and the vertical differentiation absolute values of the pixel values in the surroundings of the pixel of interest, which are obtained on the basis of Expressions (3), are added as non-linear feature amounts, is to be used as a tap, the number of elements of the tap is 75 (=25+25+25). Thus, the number of elements of the vector of the discrimination coefficient z is also 75. Furthermore, in a case where the linear feature amount to which the maximum value and the minimum value of the pixel values in the surroundings of the pixel of interest, which are obtained on the basis of Expressions (4), the maximum value of the horizontal differentiation absolute values, and the maximum value of the vertical differentiation absolute values are added as non-linear feature amounts, is to be used as a tap, the number of elements of the tap is 79 (=25+25+25+2+2). Thus, the number of elements of the vector of the discrimination coefficient z is also 79.

The prediction value is computed by the discrimination prediction unit 27 by using the coefficient z learnt in the manner described above, thereby making it possible to determine which one of the discrimination class A and the discrimination class B the pixel of interest of the student image belongs to. The discrimination prediction unit 27 substitutes the tap and the discrimination coefficient z (including the bias parameter $z_o$ as necessary) in Expression (10), and computes the prediction value $y_i$.

Then, as a result of the computation by the discrimination prediction unit 27, the pixel of interest of the tap for which the prediction value $y_i$ has become greater than or equal to 0 can be estimated to be a pixel belonging to the discrimination class A, and the pixel of interest of the tap for which the prediction value $y_i$ has become less than 0 can be estimated to be a pixel belonging to a discrimination class B.

However, the estimation using the result of the computation by the discrimination prediction unit 27 is not necessarily true. That is, the prediction value $y_i$ computed by substituting the tap and the discrimination coefficient z in Expression (10) is the result predicted from the pixel values of the student image regardless of the pixel values (true values) of the teacher image. As a consequence, in practice, there is a case in which a pixel belonging to the discrimination class A is estimated to be a pixel belonging to the discrimination class B or a pixel belonging to the discrimination class B is estimated to be a pixel belonging to the discrimination class A.

Accordingly, in the embodiment of the present invention, by causing a discrimination coefficient to be repeatedly learnt, prediction with higher accuracy is made possible.

That is, on the basis of the prediction result by the discrimination prediction unit 27, the class division unit 28 divides each pixel forming the student image into pixels belonging to the discrimination class A and pixels belonging to the discrimination class B.

Then, similarly to the above-described case, the regression coefficient learning apparatus 21 learns the regression coefficient w by targeting only the pixels belonging to the discrimination class A by the class division unit 28, and stores the regression coefficient w in the regression coefficient storage unit 22. Similarly to the above-described case, the regression prediction unit 23 computes the prediction value through regression prediction by targeting only the pixels that are determined to belong to the discrimination class A by the class division unit 28.

By comparing the prediction value obtained in the manner described above with the true value, the labeling unit 24 further labels the pixel that is determined to belong to the discrimination class A by the class division unit 28 as the discrimination class A or the discrimination class B.

Furthermore, similarly to the above-described case, the regression coefficient learning apparatus 21 learns the regression coefficient w by targeting only the pixels that are determined to belong to the discrimination class B by the class division unit 28. Similarly to the above-described case, the regression prediction unit 23 computes the prediction value through regression prediction by targeting only the pixels that are determined to belong to the discrimination class B by the class division unit 28.

By comparing the obtained prediction value with the true value in the manner described above, the labeling unit 24 further labels the pixel that is determined to belong to the discrimination class B by the class division unit 28 as the discrimination class A or the discrimination class B.

That is, the pixels of the student image are divided into four sets. A first set is set as a set of pixels, which are the pixels that are determined to belong to the discrimination class A by the class division unit 28 and that are labeled as the discrimination class A by the labeling unit 24. A second set is set as a set of pixels, which are determined to belong to the discrimination class A by the class division unit 28 and are labeled as the discrimination class A by the labeling unit 24. A third set is set as a set of pixels, which are the pixels that are determined to belong to the discrimination class B by the class division unit 28 and are labeled as the discrimination class A by the labeling unit 24. A fourth set is set as a set of pixels, which are the pixels that are determined to belong to the discrimination class B by the class division unit 28 and are labeled as the discrimination class B by the labeling unit 24.

Thereafter, on the basis of the first set and the second set among the above-described four sets, the discrimination coefficient learning apparatus 25 learns the discrimination coefficient z again similarly to the above-described case. At this time, for example, $N_A$ and $N_B$ of Expression (12) denote the total number of the pixels (samples) of the first set and the total number of the pixels (samples) of the second set, respectively. Furthermore, on the basis of the third set and the fourth set among the four sets, the discrimination coefficient learning apparatus 25 learns the discrimination coefficient z again. At this time, for example, $N_A$ and $N_B$ of Expression (12) denote the total number of the pixels (samples) of the third set and the total number of the pixels (samples) of the fourth set, respectively.

Figure 6:
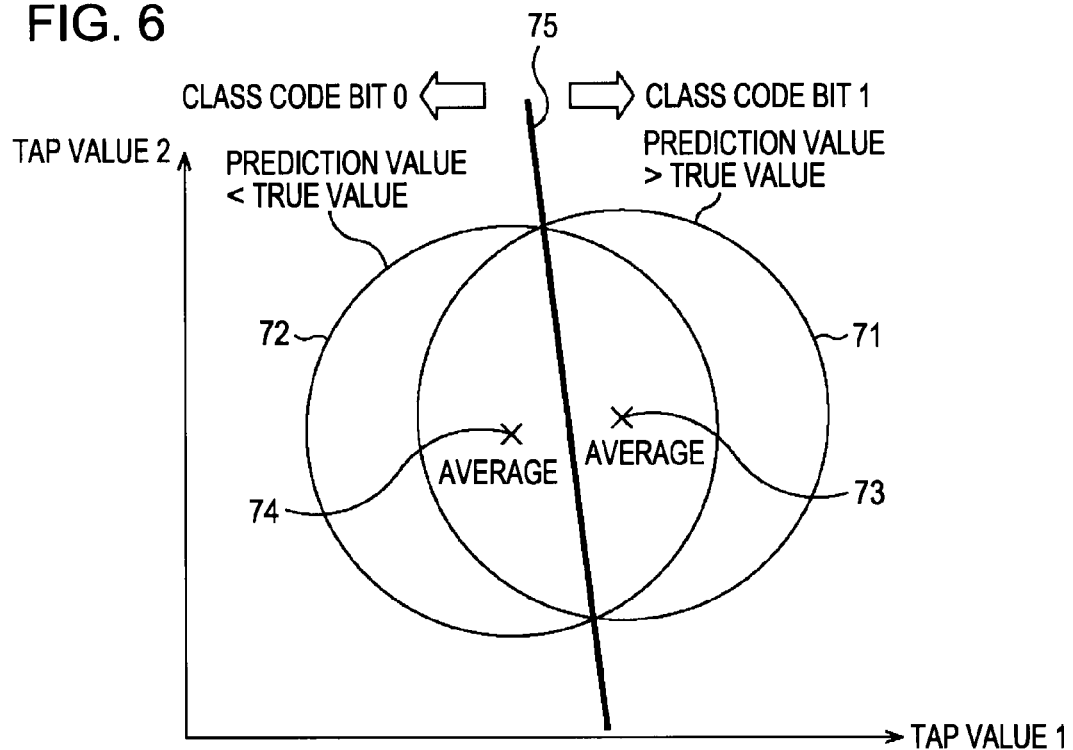
FIG. 6 illustrates learning of a discrimination coefficient, which is performed in an iterative manner.
Figure 7:
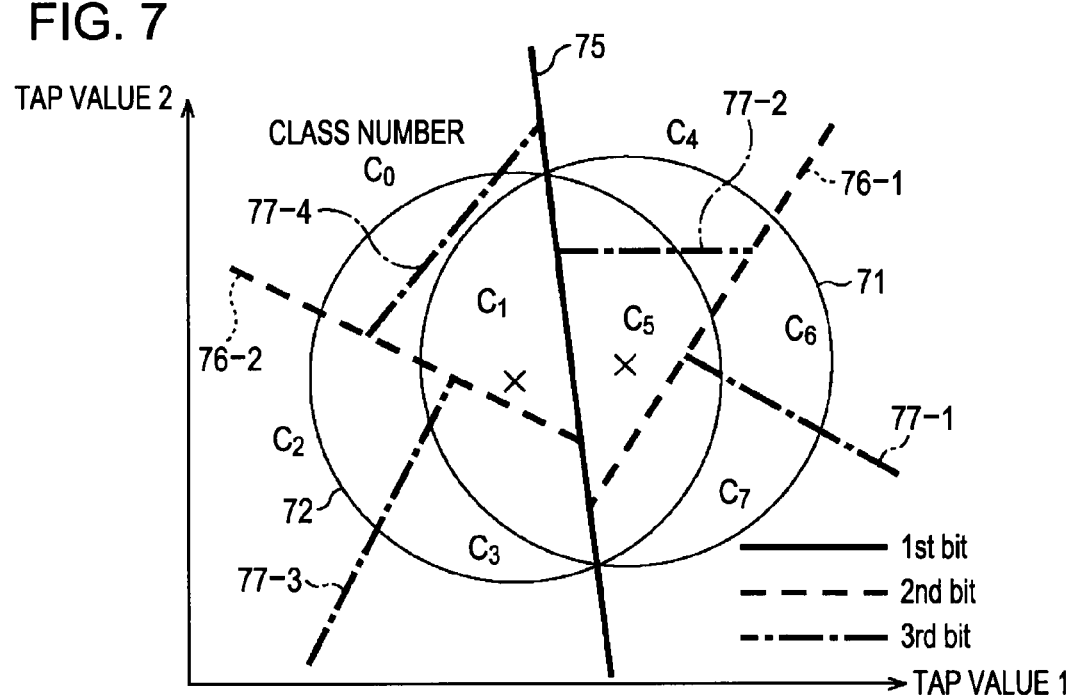
FIG. 7 illustrates learning of a discrimination coefficient, which is performed in an iterative manner.

FIGS. 6 and 7 are diagrams illustrating learning of a discrimination coefficient, which is performed in an iterative manner.

FIG. 6 shows a space representing each of the taps of a student image, in which a tap value 1 is plotted along the horizontal axis and a tap value 2 is plotted along the vertical axis, which are the tap values obtained from the student image. That is, in FIG. 6, for simplicity of description, all the taps that can exist in the student image by assuming the number of elements of the taps virtually to be two are represented on a two-dimensional space. Therefore, in FIG. 6, it is assumed that the tap is a vector formed of two elements.

A circle 71 shown in FIG. 6 represents a set of taps corresponding to the pixels labeled as the discrimination class A at first by the labeling unit 24. A circle 72 represents a set of taps corresponding to the pixels labeled as the discrimination class B at first by the labeling unit 24. A symbol 73 indicated in the circle 71 represents the position of the average value of the values of the elements of the tap contained in the circle 71. A symbol 74 indicated in the circle 71 represents the position of the average value of the values of the elements of the tap contained in the circle 72.

As shown in FIG. 6, the circle 71 and the circle 72 overlap each other. Therefore, the taps corresponding to the pixels labeled as the discrimination class A could not be accurately discriminated from the taps corresponding to the pixels labeled as the discrimination class B on the basis of only the values of the elements of the taps obtained from the student image.

However, it is roughly possible to identify a boundary line 75 for discriminating two classes on the basis of the symbols 73 and 74. Here, the process for identifying the boundary line 75 corresponds to a discrimination prediction process by the discrimination prediction unit 27, in which the discrimination coefficient z obtained by the first learning performed by the discrimination coefficient learning apparatus 25 is used. The tap positioned in the boundary line 75 is a tap for which the prediction value $y_i$ computed on the basis of Expression (10) has become 0.

In order to identify the set of taps positioned on the right side of the boundary line 75 in the figure, the class division unit 28 assigns a class code bit 1 to the pixels corresponding to those taps. Furthermore, in order to identify the set of taps positioned on the left side of the boundary line 75 in the figure, the class division unit 28 of FIG. 1 assigns a class code bit 0 to the pixels corresponding to those taps.

The discrimination coefficient z obtained by the first learning is associated with a code representing a discrimination coefficient for use in discrimination prediction, and is stored in the discrimination coefficient storage unit 26 of FIG. 1.

Furthermore, on the basis of only the pixels to which the class code bit 1 has been assigned on the basis of the result of the first discrimination prediction, the regression coefficient w is learnt again, and regression prediction is performed. In a similar manner, on the basis of the result of the first discrimination prediction, the regression coefficient w is learnt again on the basis of only the pixels to which the class code bit 0 has been assigned, and regression prediction is performed.

Then, the learning of the discrimination coefficient is repeated on the basis of the group of pixels to which the class code bit 1 has been assigned and the group of pixels to which the class code bit 0 has been assigned. As a result, the group of pixels to which the class code bit 1 has been assigned is further divided into two portions and also, the group of pixels to which the class code bit 2 has been assigned is further divided into two portions. The division at this time is performed by the discrimination prediction of the discrimination prediction unit 27 using the discrimination coefficient z obtained by second learning, which is performed by the discrimination coefficient learning apparatus 25.

The discrimination coefficient z obtained by the second learning is associated with a code representing a discrimination coefficient for use for second discrimination prediction, and is stored in the discrimination coefficient storage unit 26 of FIG. 1. The discrimination coefficient z obtained by the second learning is used for discrimination prediction performed by targeting a group of pixels to which the class code bit 1 has been assigned by the first discrimination prediction and a group of pixels to which the class code bit 0 has been assigned by the first discrimination prediction. Therefore, the discrimination coefficient z is associated with a code representing which group of pixels is targeted for use for discrimination prediction, and is stored in the discrimination coefficient storage unit 26 of FIG. 1. That is, two types of discrimination coefficients z used for the second discrimination prediction are stored.

Furthermore, on the basis of the results of the first and second discrimination predictions, the regression coefficient w is learnt again on the basis of only the pixels to which the class code bit 11 has been assigned, and regression prediction is performed. In a similar manner, on the basis of the results of the first and second discrimination predictions, the regression coefficient w is learnt again on the basis of only the pixels to which class code bits 10 has been assigned, and a regression prediction is performed. Furthermore, on the basis of the results of the first and second discrimination predictions, the regression coefficient w is learnt again on the basis of only the pixels to which class code bits 01 has been assigned. Then, on the basis of only the pixels to which class code bits 00 has been assigned, the regression coefficient w is learnt again, and regression prediction is performed.

By repeating the above-described processing, the space shown in FIG. 6 is divided into portions, as shown in FIG. 7.

Similarly to FIG. 6, FIG. 7 shows taps of a student image, in which a tap value 1 is plotted along the horizontal axis and a tap value 2 is plotted along the vertical axis. FIG. 7 shows an example in the case that the discrimination coefficient learning apparatus 25 has learnt a discrimination coefficient three times in an iterative manner. That is, the discrimination prediction using the discrimination coefficient z obtained by the first learning allows the boundary line 75 to be identified, and the discrimination prediction using the discrimination coefficient z obtained by the second learning allows boundary lines 76-1 and 76-2 to be identified. The discrimination prediction using the discrimination coefficient z obtained by the third learning allows boundary lines 77-1 to 77-4 to be identified.

The class division unit 28 of FIG. 1 assigns the class code bit of the first bit in order to identify the set of taps divided by the boundary line 75, assigns the class code bit of the second bit in order to identify the set of taps divided by the boundary lines 76-1 and 76-2, and assigns the class code bit of the third bit in order to identify the set of taps divided by the boundary lines 77-1 to 77-4.

Therefore, as shown in FIG. 7, the taps are divided (classified) into eight classes, that is, class numbers C0 to C7, which are identified on the basis of the 3-bit class code.

In a case where classification is performed as shown in FIG. 7, one type of discrimination coefficient z for use for the first discrimination prediction is stored in the discrimination coefficient storage unit 26 of FIG. 1, two types of discrimination coefficients z for use for second discrimination prediction are stored therein, and four types of discrimination coefficients z for use for third discrimination prediction are stored therein.

Furthermore, in a case where classification is performed as shown in FIG. 7, eight types of regression coefficients w corresponding to the class numbers C0 to C7, respectively, are stored in the regression coefficient storage unit 22 of FIG. 1. Here, the eight types of regression coefficients w corresponding to the class numbers C0 to C7, respectively, use, as a sample, the tap of the pixel of interest of the student image classified into each of the class numbers C0 to C7, as a result of the third discrimination prediction, and the pixel value of the teacher image corresponding to the pixel of interest, and learning of the regression coefficient is performed again for each class number and stored.

As described above, if the discrimination coefficient z is learnt in advance by using the student image and the teacher image and discrimination prediction is repeated with regard to an input image in an iterative manner, it is possible to classify the pixels of the input image into eight classes, that is, the class numbers C0 to C7. Then, if regression prediction is performed using the taps corresponding to the pixels classified into eight classes and the regression coefficient w corresponding to each class, it is possible to perform an appropriate high-quality image forming process.

Figure 8:
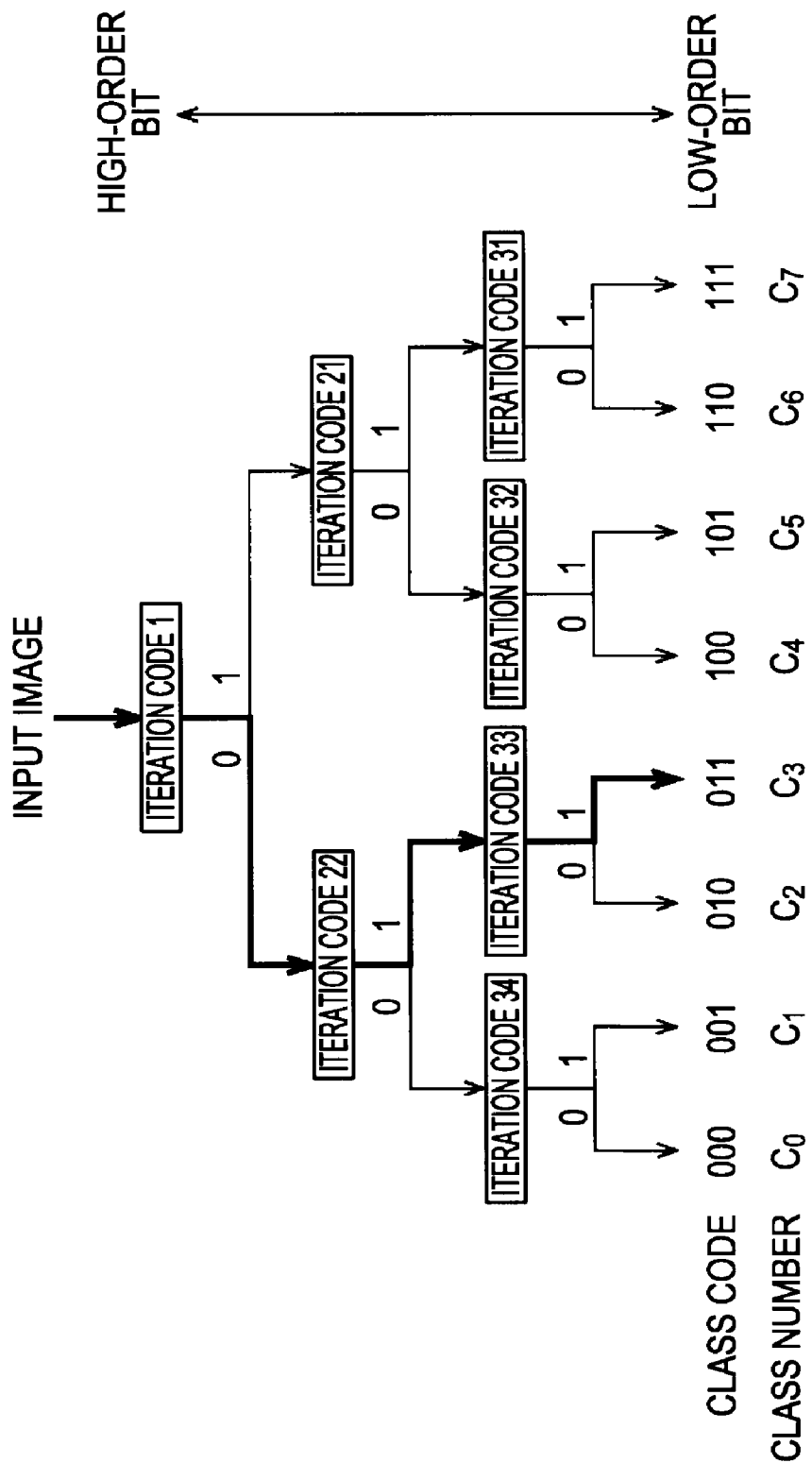
FIG. 8 illustrates an example of a case in which an input image is classified as shown in FIG. 7 by using binary tree structure.

FIG. 8 illustrates an example in the case that classification is performed on an input image by using a binary tree structure, as shown in FIG. 7. The pixels of the input image are classified into pixels to which the class code bit 1 or 0 of the first bit has been assigned by the first discrimination prediction. It is assumed at this time that the discrimination coefficient z for use for discrimination prediction has been stored as the discrimination coefficient z corresponding to an iteration code 1 in the discrimination coefficient storage unit 26 of FIG. 1.

The pixels to which the class code bit 1 of the first bit has been assigned are further classified into pixels to which the class code bit 1 or 0 of the second bit is assigned. It is assumed at this time that the discrimination coefficient z for use for discrimination prediction has been stored as the discrimination coefficient z corresponding to an iteration code 21 in the discrimination coefficient storage unit 26 of FIG. 1. In a similar manner, the pixels to which the class code bit 0 of the first bit has been assigned are further classified into pixels to which the class code bit 1 or 0 of the second bit is assigned. It is assumed at this time that the discrimination coefficient z for use for discrimination prediction has been stored as the discrimination coefficient z corresponding to an iteration code 22 in the discrimination coefficient storage unit 26 of FIG. 1.

The pixels to which the class code bits 11 of the first and second bits have been assigned are further classified into pixels to which a class code bit 1 or 0 of the third bit is assigned. It is assumed at this time that the discrimination coefficient z for use for discrimination prediction has been stored as the discrimination coefficient z corresponding to an iteration code 31 in the discrimination coefficient storage unit 26 of FIG. 1. The pixels to which the class code bits 10 of the first and second bits have been assigned are further classified into pixels to which the class code bit 1 or 0 of the third bit is assigned. It is assumed at this time that the discrimination coefficient z for use for discrimination prediction has been stored as the discrimination coefficient z corresponding to an iteration code 32 in the discrimination coefficient storage unit 26 of FIG. 1.

In a similar manner, the pixels to which the class code bits 01 or 00 of the first and second bits have been assigned are further classified into pixels to which the class code bit 1 or 0 of the third bit is assigned. Then, it is assumed that the discrimination coefficient z corresponding to an iteration code 33 or 34 has been stored in the discrimination coefficient storage unit 26 of FIG. 1.

As described above, as a result of performing discrimination three times in an iterative manner, a class code formed of 3 bits is set to each of the pixels of the input image, so that the class number is identified. Then, the regression coefficient w corresponding to the identified class number is also identified.

In this example, a value such that the class code bits are connected from the high-order bit to the low-order bit in descending order of the number of iterations correspond to a class numbers. Therefore, the class number Ck corresponding to the final class code is identified on the basis of, for example, Expression (16).

$$k=\{011\}_2=3 \qquad (16)$$

Furthermore, as shown in FIG. 8, the relationship between an number of iterations p and a final class number Nc is represented in accordance with Expression (17).

$$N_c=2^p \qquad (17)$$

The final class number Nc is equal to the total number Nm of the regression coefficients w that are used finally.

The total number Nd of the discrimination coefficients z can be represented in accordance with Expression (18).

$$N_d=2^p-1 \qquad (18)$$

In discrimination prediction in the high-quality image forming process using an image processing apparatus (to be described later), by adaptively decreasing the number of iterations, it is possible to achieve robustness and speeding up of processing. In such a case, since the regression coefficient used at each branch of FIG. 8 becomes necessary, the total number of the regression coefficients is represented in accordance with Expression (19).

$$N_m=2^{p+1}-1 \qquad (19)$$

Here, an example has been described in which, mainly, learning of a discrimination coefficient is performed three times in an iterative manner, but the number of iterations may be one. That is, after the learning of the first discrimination coefficient is completed, the computation of the discrimination coefficient z by the discrimination coefficient learning apparatus 25 and the discrimination prediction by the discrimination prediction unit 27 may not be repeatedly performed.

Figure 9:
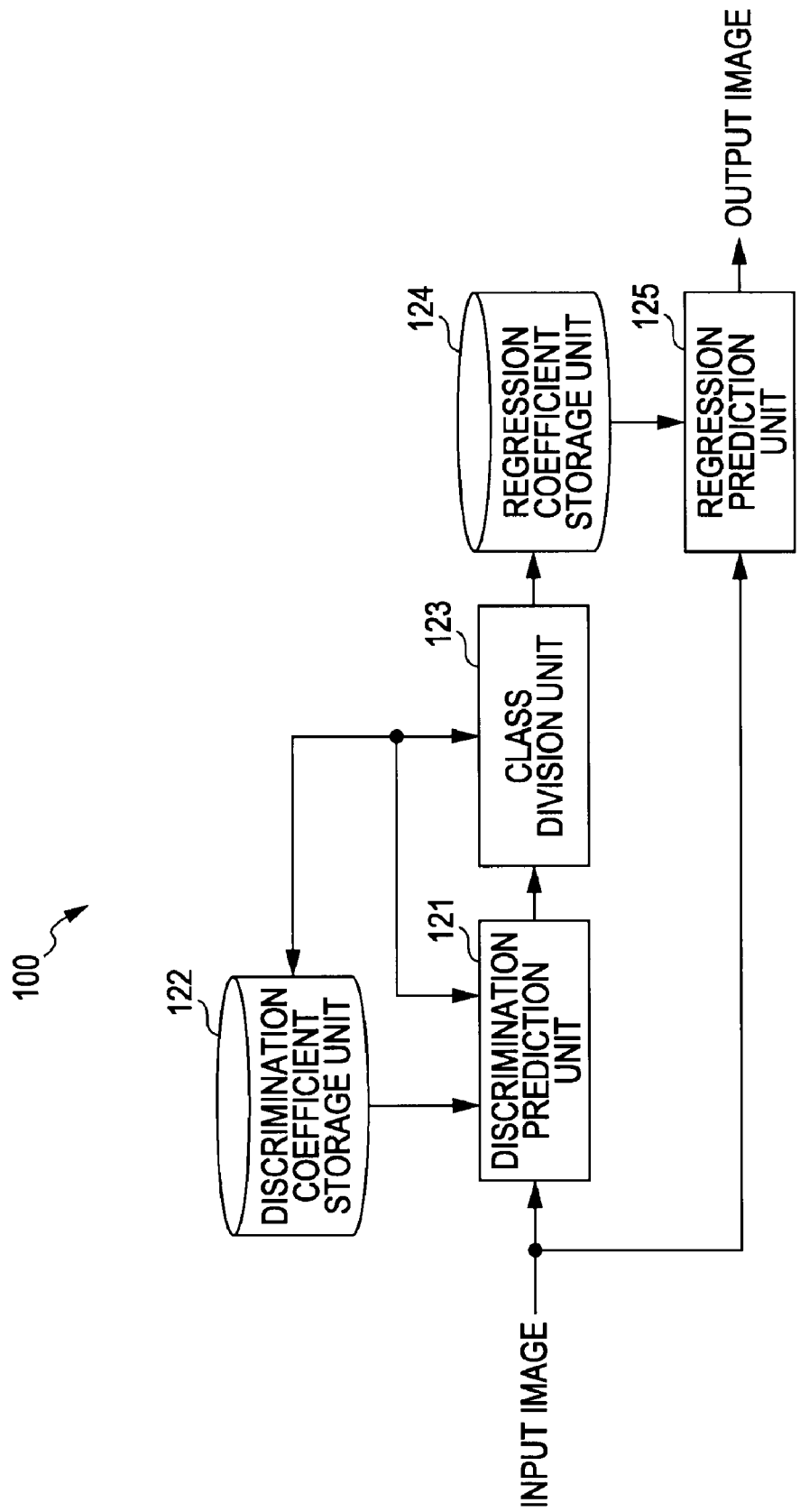
FIG. 9 is a block diagram showing an example of the configuration of an image processing apparatus corresponding to the learning apparatus of FIG. 1.

FIG. 9 is a block diagram showing an example of the configuration of an image processing apparatus according to the embodiment of the present invention. An image processing apparatus 100 of FIG. 9 is formed as an image processing apparatus corresponding to the learning apparatus 10 of FIG. 1. That is, the image processing apparatus 100 determines each class of each of the pixels of the input image by using the discrimination coefficient learnt by the learning apparatus 10. Then, the image processing apparatus 100 performs regression prediction computation of taps obtained from the input image by using the discrimination coefficient learnt by the learning apparatus 10, which is a regression coefficient corresponding to the determined class, and performs image processing for making an input image have higher quality.

That is, in the discrimination coefficient storage unit 122 of the image processing apparatus 100, the discrimination coefficient z stored in the discrimination coefficient storage unit 26 of the learning apparatus 10 is prestored. In the regression coefficient storage unit 124 of the image processing apparatus 100, the regression coefficient w stored in the regression coefficient storage unit 22 of the learning apparatus 10 is prestored.

The discrimination prediction unit 121 of FIG. 9 sets a pixel of interest in the input image, obtains a tap corresponding to the pixel of interest, and performs computation predicted by referring to Expression (10). At this time, the discrimination prediction unit 121 identifies an iteration code on the basis of the number of iterations and the group of pixels for which discrimination prediction is performed, and reads the discrimination coefficient z corresponding to the iteration code from the discrimination coefficient storage unit 122.

On the basis of the prediction result of the discrimination prediction unit 121, the class division unit 123 assigns a class code bit to the pixel of interest, thereby dividing the pixels of the input image to two sets. At this time, as described above, for example, the prediction value $y_i$ computed on the basis of, for example, Expression (10) is compared with 0, and the class code bit is assigned to the pixel of interest.

After undergoing the process of the class division unit 123, the discrimination prediction unit 121 performs discrimination prediction in an iterative manner, and division further is performed by the class division unit 123. Discrimination prediction is performed in an iterative manner for the preset number of times. For example, in a case where discrimination prediction is performed by performing three iterations, for example, in the manner described above with reference to FIG. 7 or 8, the input image is classified into a group of pixels corresponding to a class number of a 3-bit class code.

The number of iterations of discrimination prediction in the image processing apparatus 100 is set so as to become equal to the number of iterations of the learning of the discrimination coefficient by the learning apparatus 10.

The class division unit 123 supplies the information for identifying each pixel of the input image to the regression coefficient storage unit 124 in such a manner that the information is associated with the class number of the pixel.

The regression prediction unit 125 sets a pixel of interest in the input image, obtains a tap corresponding to the pixel of interest, and performs computation predicted by referring to Expression (2). At this time, the regression prediction unit 125 supplies the information for identifying the pixel of interest to the regression coefficient storage unit 124, and reads the regression coefficient w corresponding to the class number of the pixel of interest from the regression coefficient storage unit 124.

Then, an output image is generated in which the prediction value obtained by the computation of the regression prediction unit 125 is set as the value of the pixel corresponding to the pixel of interest. As a result, an output image in which an input image is made to have higher quality is obtained.

As described above, according to the embodiment of the present invention, by performing discrimination prediction on an input image, it is possible to classify the pixels (in practice, the taps corresponding to the pixel of interest) forming the input image into a class suitable for a high-quality image forming process.

In the related art, since hard-coded classification based on only the local feature amount of the input image using, for example, 1-bit ADRC is performed, it is not necessarily efficient classification in the meaning of a regression coefficient that links the input image and the teacher image.

In comparison, in the embodiment of the present invention, an appropriate classification method suited for the objective of a high-quality image forming process, such as a process for generating a noise-removed image from a noise-containing image, a process for generating a blurred image from a blur-free image, and a process for generating a high-resolution image from a low-resolution image, can be automatically learnt.

Furthermore, in the embodiment of the present invention, by performing discrimination prediction in an iterative manner, classification can be performed more appropriately. Furthermore, in the middle of the process of the discrimination prediction performed in an iterative manner, it is not necessary to generate intermediate data or the like in which processing has been performed on the pixel values of the input image, thereby making it possible to speed up the processing. That is, in the case of predicting an output image, it is possible to perform classification and regression prediction with computations of (p+1) times at most (Expression (2)) with respect to any pixel, thereby making high-speed processing possible. Furthermore, when classification and regression prediction are to be performed, intermediate data for computations of taps is not used, and the classification and regression prediction is completed with only the computation with respect to input at all times. Thus, it is possible to use a pipeline structure in implementation.

Next, a description will be given, with reference to the flowchart in FIG. 10, of the details of a discrimination coefficient regression coefficient learning process. This process is performed by the learning apparatus 10 of FIG. 1.

In step S101, the discrimination coefficient learning apparatus 25 identifies an iteration code. Since this case is a process of first learning, the iteration code is identified as 1.

In step S102, the regression coefficient learning unit 21, the regression coefficient storage unit 22, the regression prediction unit 23, and the labeling unit 24 perform a labeling process to be described later with reference to FIG. 11. Here, a description will be given below, with reference to the flowchart in FIG. 11, of a detailed example of a labeling process in step S102 of FIG. 10.

Figure 12:
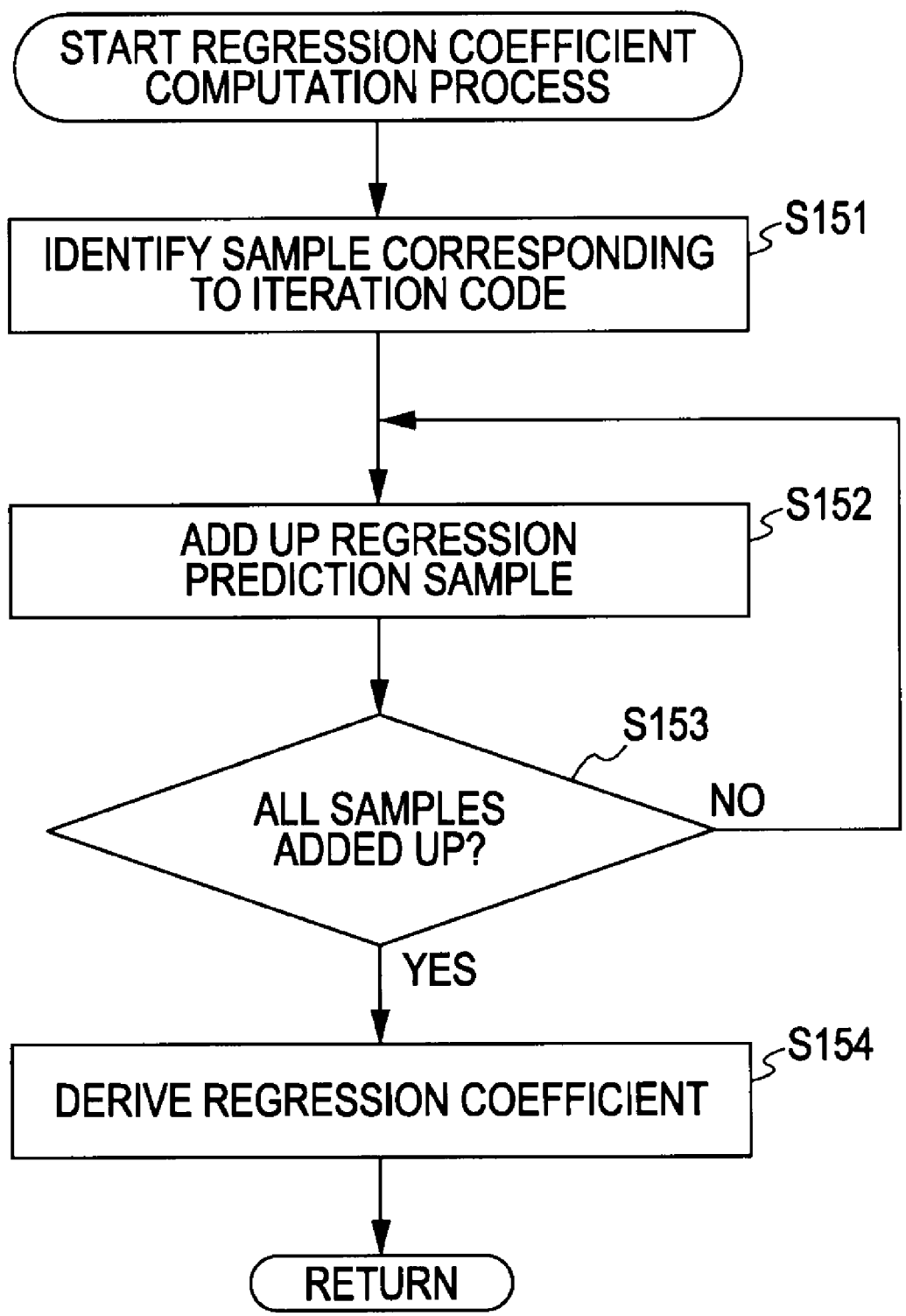
FIG. 12 is a flowchart illustrating an example of a regression coefficient computation process.

In step S131, the regression coefficient learning apparatus 21 performs a regression coefficient learning process to be described later with reference to FIG. 12. As a result, the regression coefficient w for use for computation for predicting the pixel values of a teacher image on the basis of the pixel values of a student image is determined.

In step S132, the regression prediction unit 23 computes the regression prediction value by using the regression coefficient w determined by the process in step S131. At this time, for example, the computation of Expression (2) is performed, and a prediction value $y_i$ is determined.

In step S133, the labeling unit 24 compares the prediction value $y_i$ obtained by the process of step S132 with a true value $t_i$ that is the pixel value of the teacher image.

In step S134, on the basis of the comparison result in step S133, the labeling unit 24 labels the pixel of interest (in practice, the tap corresponding to the pixel of interest) as the discrimination class A or the discrimination class B. As a result, for example, as described above with reference to FIG. 5, labeling of the discrimination class A or the discrimination class B is performed.

The processing of steps S132 to S134 is performed by targeting each of the pixels to be processed, which are determined in such a manner as to correspond to the iteration code.

The labeling process is performed in the manner described above.

Next, a description will be given, with reference to the flowchart in FIG. 12, a detailed example of the regression coefficient computation process in step S13 of FIG. 11.

In step S151, the regression coefficient learning apparatus 21 identifies a sample corresponding to the iteration code identified in the process of step S101. The sample at this point means a combination of the tap corresponding to the pixel of interest of the student image and the pixel of the teacher image corresponding to the pixel of interest. For example, if the iteration code is 1, this indicates part of the process of first learning and thus, the sample is identified by setting each of all the pixels of the student image as a pixel of interest. For example, if the iteration code is 21, this indicates is part of the process of second learning. Thus, the sample is identified by setting, as a pixel of interest, each of the pixels to which the class code bit 1 has been assigned in the process of the first learning from among the pixels of the student image. For example, if the iteration code is 34, this indicates part of the process of the third learning. Thus, the sample is identified by setting, as a pixel of interest, each of the pixels to which the class code bit 0 has been assigned in the process of the first learning and the class code bit 0 has been assigned in the process of the second learning from among the pixels of the student image.

In step S152, the regression coefficient learning apparatus 21 adds up the samples identified in the process of step S151. At this time, for example, the tap of the samples and the pixel values of the teacher image are added up in Expression (1).

In step S153, the regression coefficient learning apparatus 21 determines whether or not all the samples have been added up. The process of step S152 is repeatedly performed until it is determined that all the samples have been added up.

In step S154, the regression coefficient learning apparatus 21 calculates the regression coefficient w through the computations of Expressions (6) to (9).

In the manner described above, the regression coefficient computation process is performed.

Figure 10:
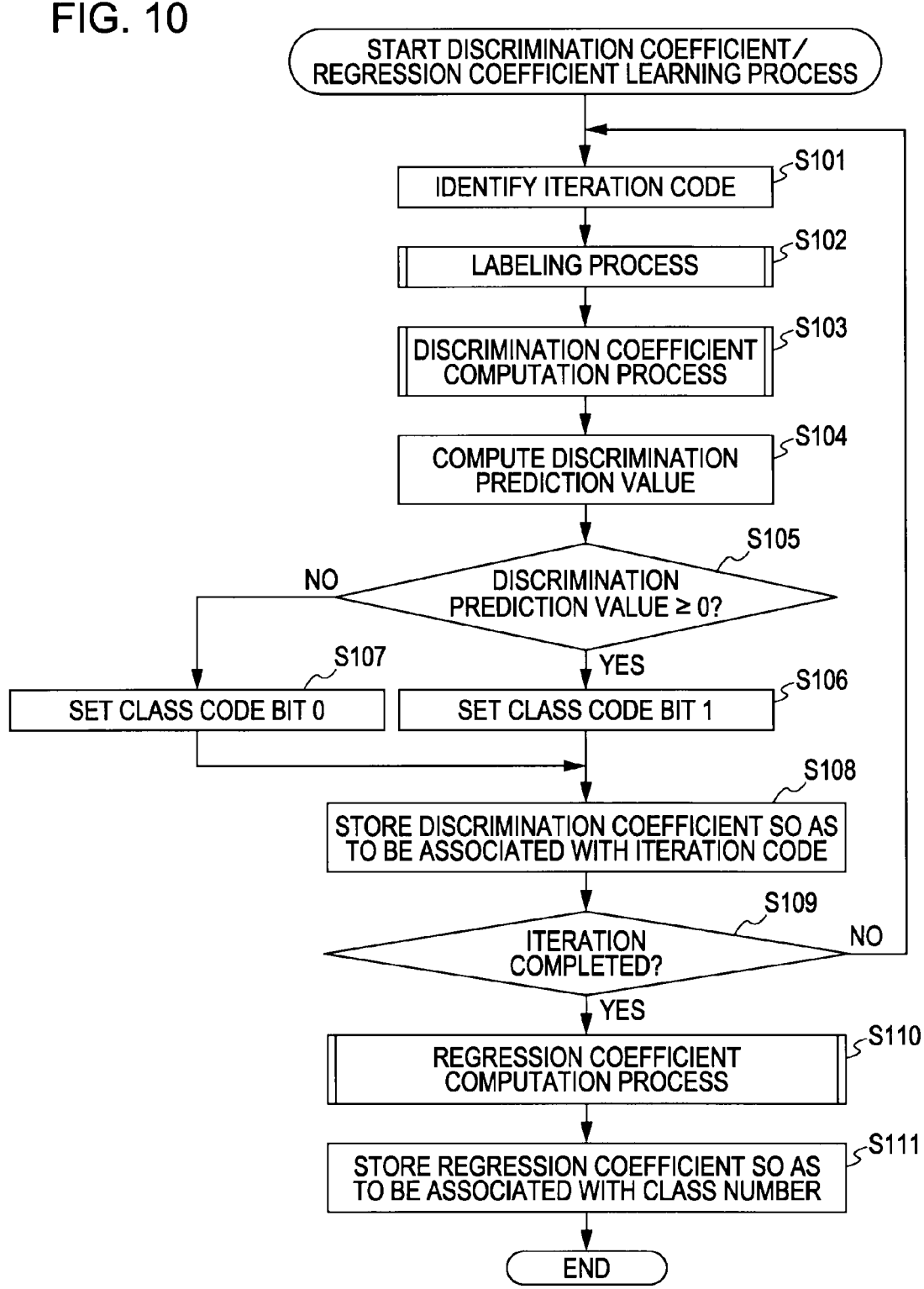
FIG. 10 is a flowchart illustrating an example of a discrimination regression coefficient learning process performed by the learning apparatus of FIG. 1.
Figure 11:
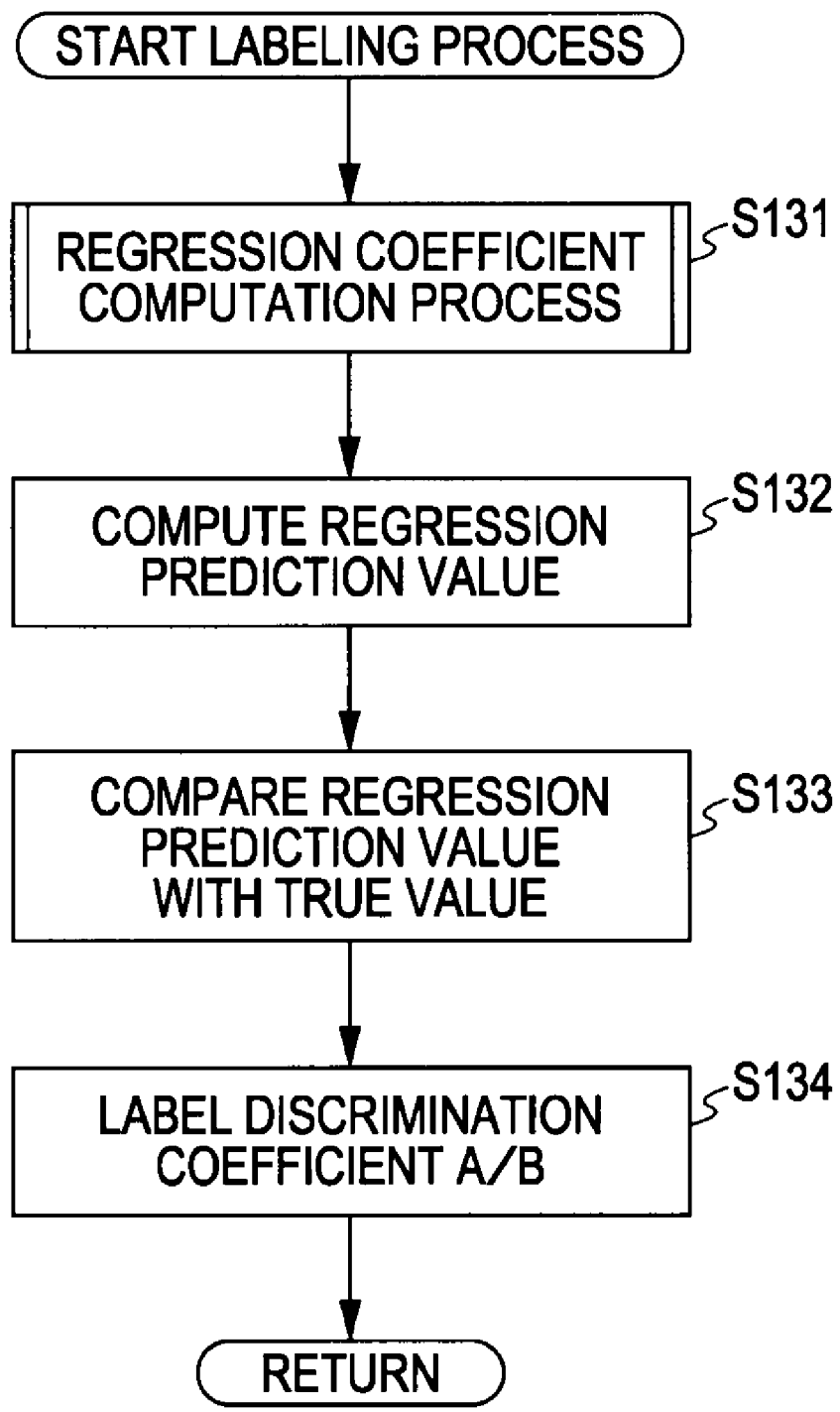
FIG. 11 is a flowchart illustrating an example of a labeling process.

As a result, the labeling process of step S102 of FIG. 10 is completed. The process then proceeds to the discrimination coefficient computation process in step S103 of FIG. 10.

Figure 13:
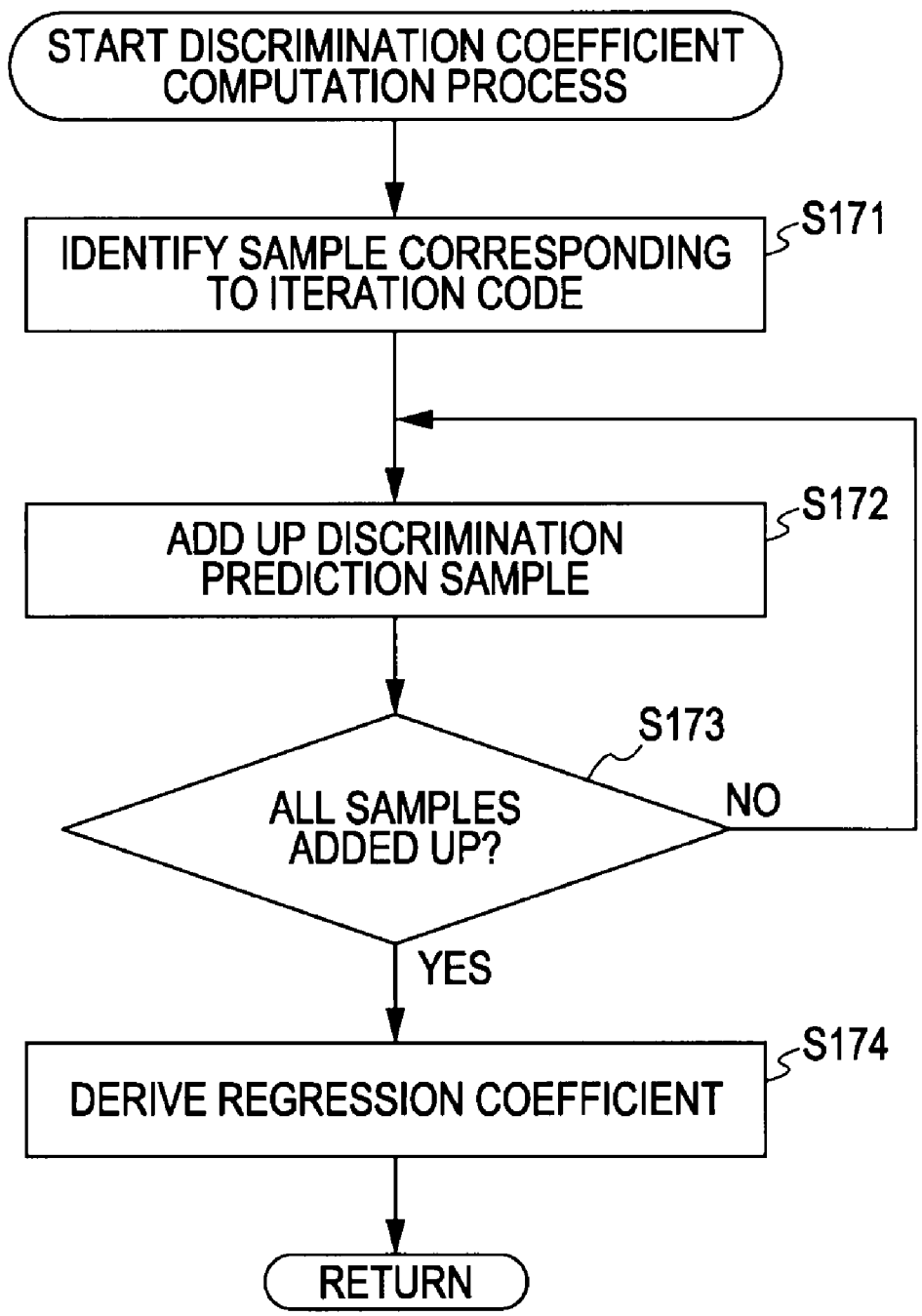
FIG. 13 is a flowchart illustrating an example of a discrimination coefficient computation process.

In step S103, the discrimination coefficient learning apparatus 25 performs a discrimination coefficient computation process to be described later with reference to FIG. 13. Here, a description will be given below, with reference to the flowchart in FIG. 13, of a detailed example of the discrimination coefficient computation process in step S103 of FIG. 10.

In step S171, the discrimination coefficient learning apparatus 25 identifies the sample corresponding to the iteration code identified in the process of step S101. The sample at this point means a combination of the tap corresponding to the pixel of interest of the student image and the result of the labeling of the discrimination class A or the discrimination class B with regard to the pixel of interest. For example, if the iteration code is 1, since this indicates the process of first learning, the sample is identified by setting each of all the pixels of the student image as a pixel of interest. For example, if the iteration code is 21, since this indicates part of the process of second learning, the sample is identified by setting, as a pixel of interest, each of the pixels to which the class code bit 1 has been assigned in the process of the first learning from among the pixels of the student image. For example, if the iteration code is 34, since this indicates part of the process of third learning, the sample is identified by setting, as a pixel of interest, each of the pixels to which the class code bit 0 has been assigned in the process of the first learning and the class code bit 0 has been assigned in the process of the second learning from among the pixels of the student image.

In step S172, the discrimination coefficient learning apparatus 25 adds up the sample identified in the process of step S171. At this time, for example, the taps of the samples, and the numerical values based on the result of the labeling for the discrimination class A or the discrimination class B are added up in Expression (11).

In step S173, the discrimination coefficient learning apparatus 25 determines whether or not all the samples have been added up. The process of step S172 is repeatedly performed until it is determined that all the samples have been added up.

In step S174, the discrimination coefficient learning apparatus 25 derives the discrimination coefficient z by the computations of Expressions (12) to (15).

In the manner described above, the discrimination coefficient computation process is performed.

Referring back to FIG. 10, in step S104, the discrimination prediction unit 23 computes the discrimination prediction value by using the coefficient z determined by the process of step S103 and the tap obtained from the student image. At this time, for example, the computation of Expression (10) is performed, and a prediction value (discrimination prediction value) $y_i$ is determined.

In step S105, the class division unit 28 determines whether or not the discrimination prediction value determined by the process of step S104 is greater than or equal to 0.

When it is determined in step S105 that the discrimination prediction value is greater than or equal to 0, the process proceeds to step S106, where the class code bit 1 is set to the pixel of interest (in practice, the tap). On the other hand, when it is determined in step S105 that the discrimination prediction value is less than 0, the process proceeds to step S107, where the class code bit 0 is set to the pixel of interest (in practice, the tap).

The processing of steps S104 to S107 is performed by targeting each of the pixels to be processed, which is determined in such a manner as to correspond to the iteration code.

After the process of step S106 or S107, the process proceeds to step S108, where the discrimination coefficient storage unit 26 stores the discrimination coefficient z determined in the process of step S103 in such a manner as to be associated with the iteration code identified in step S101.

In step S109, the learning apparatus 10 determines whether or not the iteration has been completed. For example, in a case where it has been preset that learning is performed by performing three iterations, it is determined that the iteration has not been completed. The process then returns to step S101.

Then, in step S101, the iteration code is identified again. Since this case is the first process of the second learning, the iteration code is identified as 21.

Then, in a similar manner, the processing of steps S102 to S108 is performed. At this time, as described above, in the process of step S102 and in the process of step S103, the sample is identified by setting, as a pixel of interest, each of the pixels to which the class code bit 1 has been assigned in the process of the first learning from among the pixels of the student image.

Then, it is determined in step S109 whether or not the iteration has been completed.

In the manner described above, the processing of steps S101 to S108 is repeatedly performed until it is determined in step S109 that the iteration has been completed. In a case where learning is performed by performing three iterations, the iteration code is identified to be 34 in step S101. Thereafter, the processing of steps S102 to S108 is performed, and it is determined in step S109 that the iteration has been completed.

In this manner, as a result of the processing of steps S101 to S109 being repeatedly performed, as described above with reference to FIG. 8, seven types of discrimination coefficients z are stored in the discrimination coefficient storage unit 26 in such a manner as to be associated with the iteration code.

When it is determined in step S109 that the iteration has been completed, the process proceeds to step S110.

In step S110, the regression coefficient learning apparatus 21 performs a regression coefficient computation process. Since this process is the same as that in the case described above with reference to the flowchart in FIG. 12, detailed descriptions are omitted. In this case, in step S151, the sample corresponding to the iteration code is not identified, but the sample corresponding to each class number is identified.

That is, as a result of the processing of steps S101 to S109 being repeatedly performed, as described above with reference to FIG. 8, each pixel of the student image is classified into one of the class numbers C0 to C7. Therefore, the sample is identified by setting each of the pixels of the class number C0 of the student image as a pixel of interest, and a first regression coefficient w is calculated. Furthermore, the sample is identified by setting the pixel of the class number C1 of the student image as a pixel of interest, and a second regression coefficient w is calculated; the sample is identified by setting the pixel of the class number C2 of the student image as a pixel of interest, and a third regression coefficient w is calculated; . . . and the sample is identified by setting the pixel of the class number C7 of the student image as a pixel of interest, and an eighth regression coefficient w is calculated.

That is, in the regression coefficient computation process of step S110, eight types of regression coefficients w corresponding to the class numbers C0 to C7, respectively, are determined.

In step S111, the regression coefficient storage unit 22 stores each of the eight types of the regression coefficients w determined by the process of step S110 in such a manner as to be associated with the class number.

In the manner described above, the discrimination regression coefficient learning process is performed.

Here, an example in which, mainly, learning of a discrimination coefficient is performed by performing three iterations has been described, but the number of iterations may be one. That is, after the first learning of the discrimination coefficient is completed, the computation of the discrimination coefficient z by the discrimination coefficient learning apparatus 25 or discrimination prediction by the discrimination prediction unit 27 may not be repeatedly performed.

Figure 14:
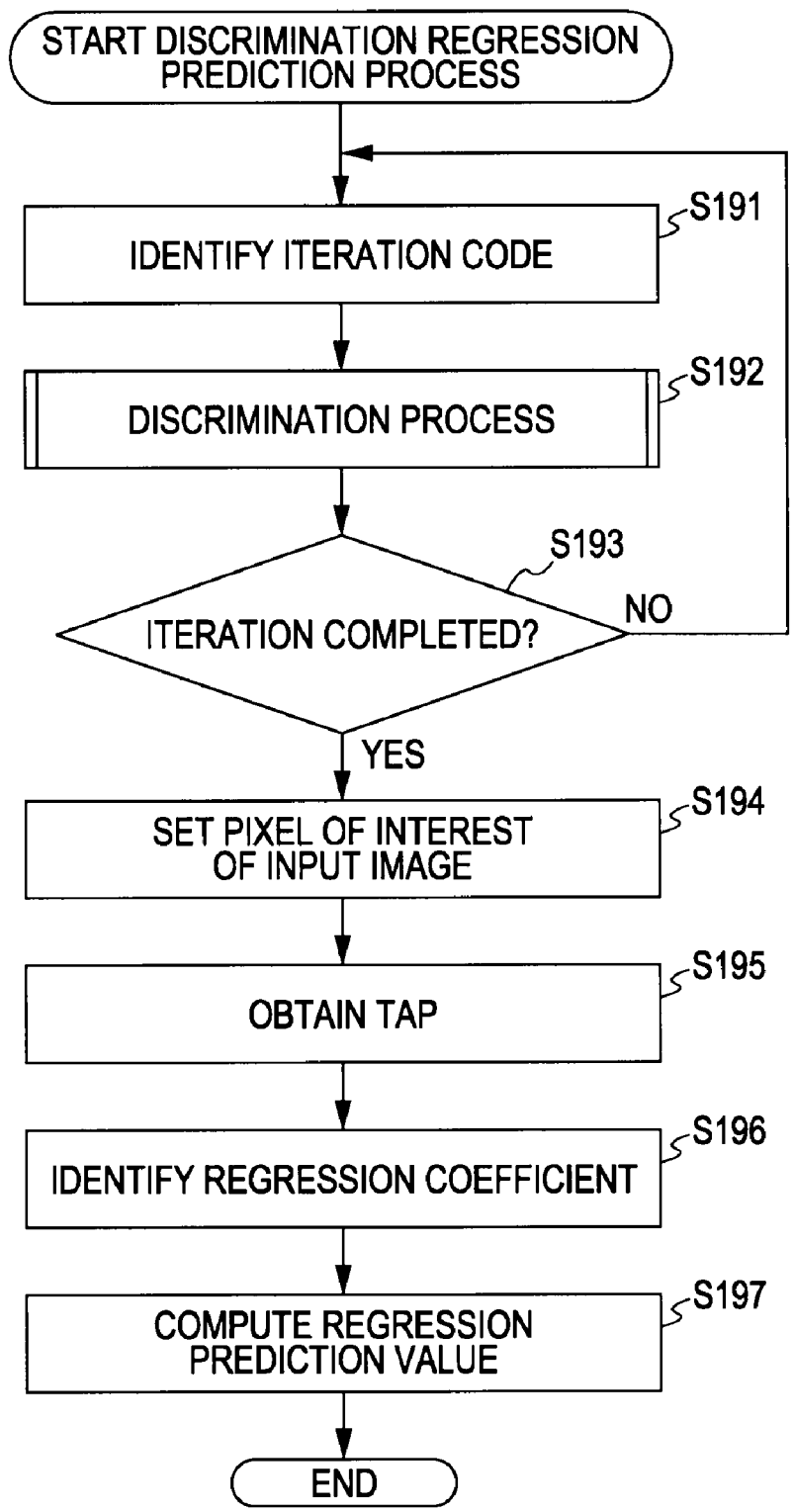
FIG. 14 is a flowchart illustrating an example of a discrimination regression prediction process performed by the image processing apparatus of FIG. 9.

Next, a description will be given, with reference to the flowchart in FIG. 14, of an example of a discrimination regression prediction process. This process is performed by the image processing apparatus 100 of FIG. 9. Furthermore, it is assumed that, prior to performing the processing, in the discrimination coefficient storage unit 122 and the regression coefficient storage unit 124 of the image processing apparatus 100, seven types of discrimination coefficients z stored in the discrimination coefficient storage unit 26, and eight types of regression coefficients w stored in the regression coefficient storage unit 22, are stored, respectively, through the discrimination regression coefficient learning process of FIG. 10.

In step S191, the discrimination prediction unit 121 identifies an iteration code. Since this case is a first discrimination process, the iteration code is identified as 1.

Figure 15:
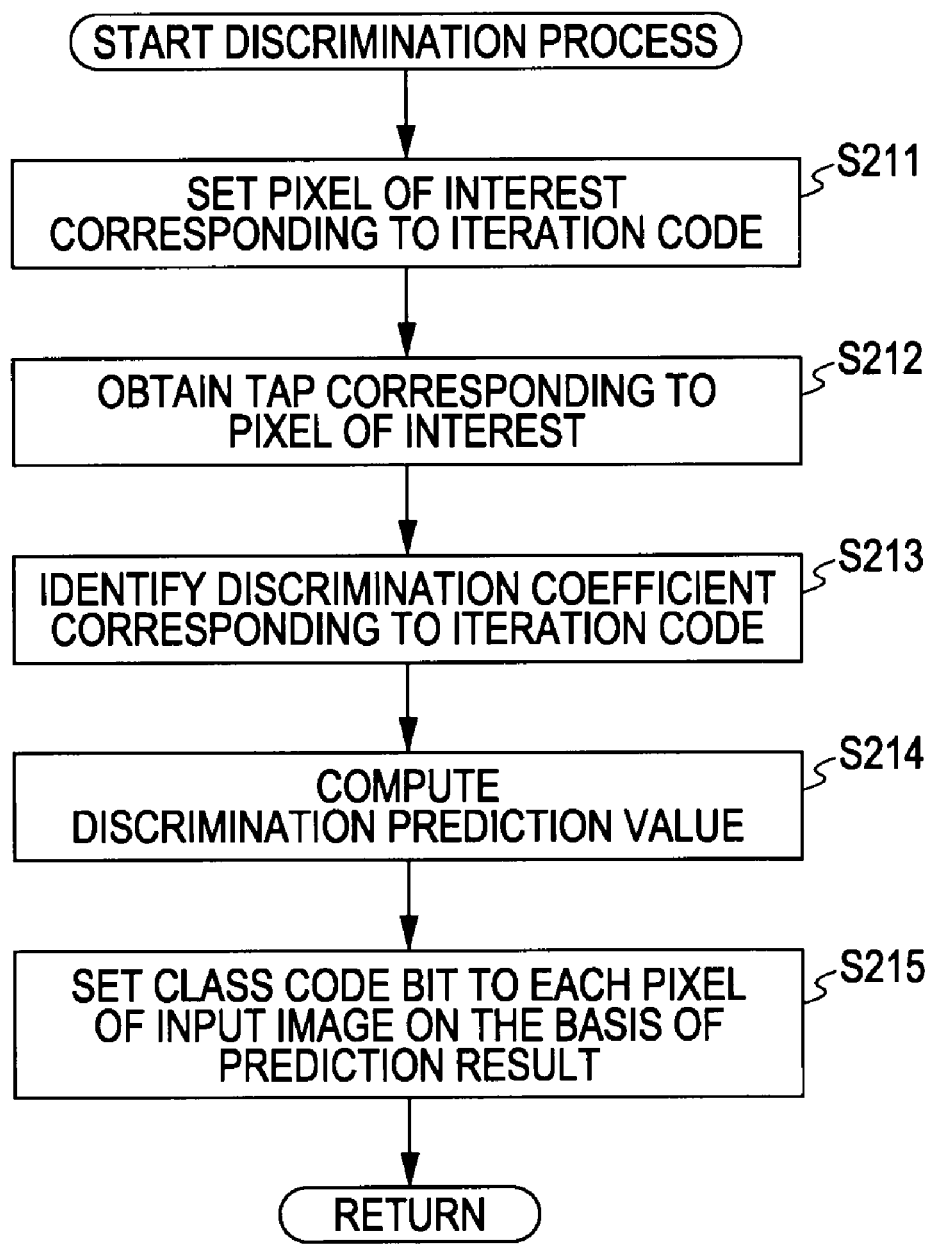
FIG. 15 is a flowchart illustrating an example of a discrimination process.

In step S192, the discrimination prediction unit 121 performs a discrimination process to be described later with reference to FIG. 15. Here, a description will be given below, with reference to the flowchart in FIG. 15, of a detailed example of a discrimination process in step S192 of FIG. 14.

In step S211, the discrimination prediction unit 121 sets a pixel of interest corresponding to the iteration code. For example, if the iteration code is 1, since this case is the process of the first discrimination, each of all the pixels of the input image is set as a pixel of interest. For example, if the iteration code is 21, since this indicates part of the process of second discrimination, each of the pixels to which the class code bit 1 has been assigned in the process of the first discrimination from among the pixels of the input image is set as a pixel of interest. For example, if the iteration code is 34, this indicates part of the process of the third discrimination, each of the pixels to which the class code bit 0 has been assigned in the process of the first discrimination and the class code bit 0 has been assigned in the process of the second discrimination is set as a pixel of interest.

In step S212, the discrimination prediction unit 121 obtains a tap corresponding to the pixel of interest set in step S211.

In step S213, the discrimination prediction unit 121 identifies the discrimination coefficient z corresponding to the iteration code identified in the process of step S211, and reads the discrimination coefficient z from the discrimination coefficient storage unit 122.

In step S214, the discrimination prediction unit 121 computes the discrimination prediction value. At this time, for example, the computation of Expression (10) described above is performed.

In step S215, on the basis of the discrimination prediction value computed in the process of step S214, the class division unit 123 sets (assigns) the class code bit to the pixel of interest. At this time, as described above, for example, the value of the prediction value $y_i$ computed on the basis of Expression (10) is compared with 0, and a class code bit is assigned to the pixel of interest.

The processing of steps S211 to S215 is performed by targeting each of the pixels to be processed, which is determined in such a manner as to correspond to the iteration code.

In the manner described above, the discrimination process is performed.

Referring back to FIG. 14, after the process of step S192, in step S193, the discrimination prediction unit 121 determines whether or not the iterations have been completed. For example, in a case where it has been preset that learning is performed by performing three iterations, it is determined that the iterations have not yet been completed, and the process then returns to step S191.

Thereafter, in step S191, the iteration code is identified as 21 and similarly, the process of step S192 is performed. At this time, as described above, in the process of step S192, each of the pixels to which the class code bit 1 has been assigned in the process of the first discrimination from among the pixels of the input image is set as a pixel of interest.

Then, in step S193, it is determined whether or not the iteration has been completed.

As described above, the processing of steps S191 to S193 is repeatedly performed until it is determined in step S193 that the iteration has been completed. In a case where it has been preset that learning is done by performing three iterations, in step S191, the iteration code is identified to be 34. Thereafter, the process of step S192 is performed, and it is determined in step S193 that the iteration has been completed.

When it is determined in step S193 that the iteration has been completed, the process proceeds to step S194. As a result of the processing thus far, as described above with reference to FIG. 7 or 8, the input image has been classified into a group of pixels corresponding to the class number of the 3-bit class code. Furthermore, as described above, the class division unit 123 supplies information for identifying each pixel of the input image, with which the class number of the pixel is associated, to the regression coefficient storage unit 124.

In step S194, the regression prediction unit 125 sets a pixel of interest in the input image.

In step S195, the regression prediction unit 125 obtains a tap corresponding to the pixel of interest set in step S194.

In step S196, the regression prediction unit 125 supplies the information for identifying the pixel of interest set in step S194 to the regression coefficient storage unit 124, identifies the regression coefficient w corresponding to the class number of the pixel of interest, and reads it from the regression coefficient storage unit 124.

In step S197, the regression prediction unit 125 performs the computation of Expression (2) by using the tap obtained in step S195 and the regression coefficient w that is identified and read in step S196, so that the regression prediction value is computed.

The processing of steps S191 to S197 is performed by targeting each of the pixels of the input image.

Then, an output image is generated in which the prediction value obtained by the computation of the regression prediction unit 125 is the value of the pixel corresponding to the pixel of interest. As a result, the output image in which the input image is made to have higher quality is obtained.

The discrimination prediction process is performed in the manner described above. As a result of the above, it is possible to perform a high-quality image forming process more efficiently and at higher speed.

Figure 16:
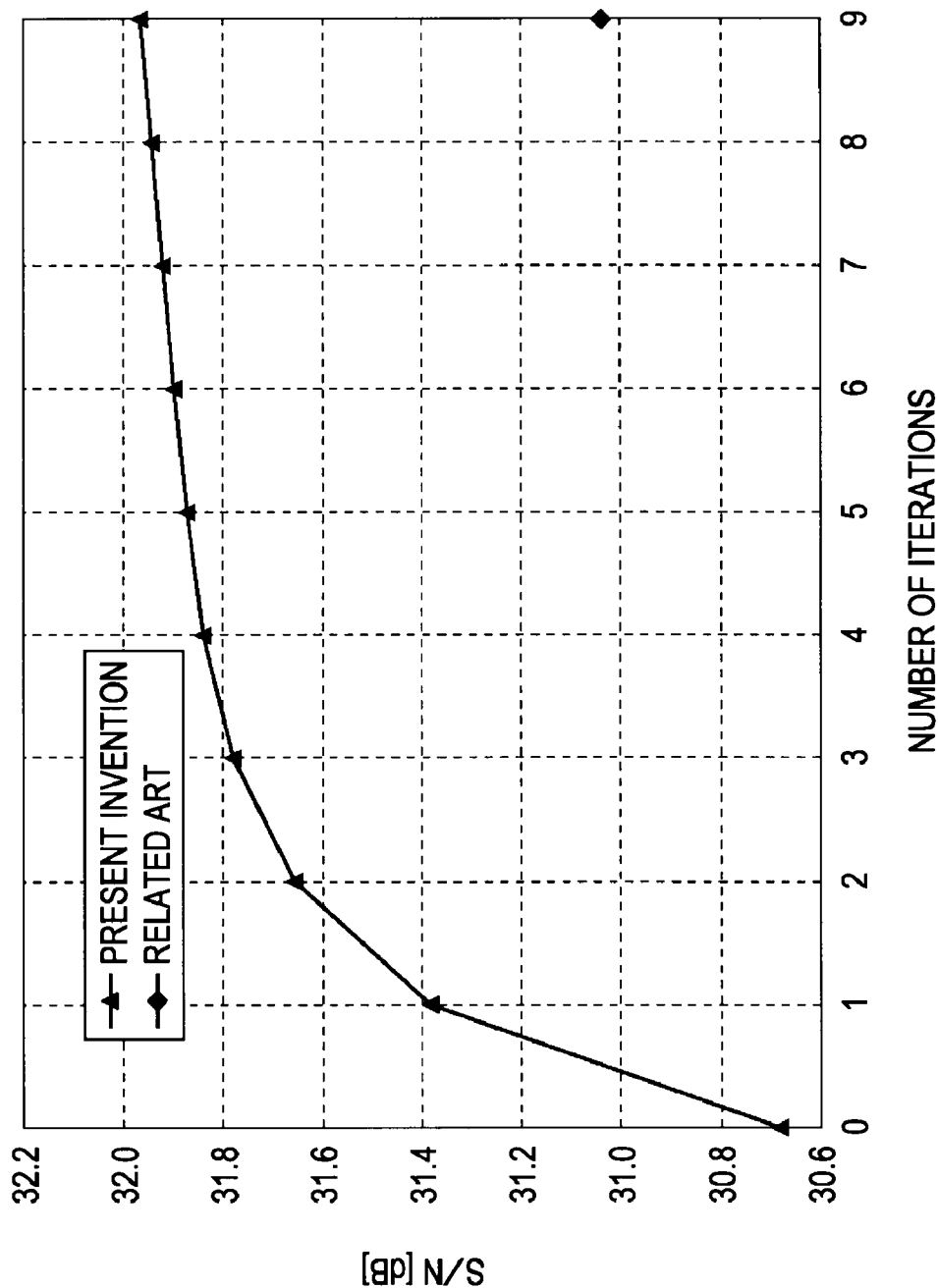
FIG. 16 illustrates advantages of a high-quality image forming process using the learning apparatus and the image processing apparatus according to the embodiment of the present invention.

FIG. 16 illustrates advantages of the high-quality image forming process using the learning apparatus 10 and the image processing apparatus 100 according to the embodiment of the present invention.

In FIG. 16, learning of a discrimination coefficient and the number of iterations of discrimination prediction are plotted along the horizontal axis, and the S/N ratio is plotted along the vertical axis. FIG. 16 shows the characteristics of an image obtained by causing the image processing apparatus 100 according to the embodiment of the present invention or by the image processing apparatus of the related art to perform image processing on an input image, which is an image in which noise is added. Points plotted using triangular symbols in FIG. 16 indicate the characteristics of the image obtained by performing image processing by the image processing apparatus 100 according to the embodiment of the present invention. Points plotted using rhombic symbols indicate the characteristics of the image obtained by performing image processing by the image processing apparatus of the related art.

Figure 17:
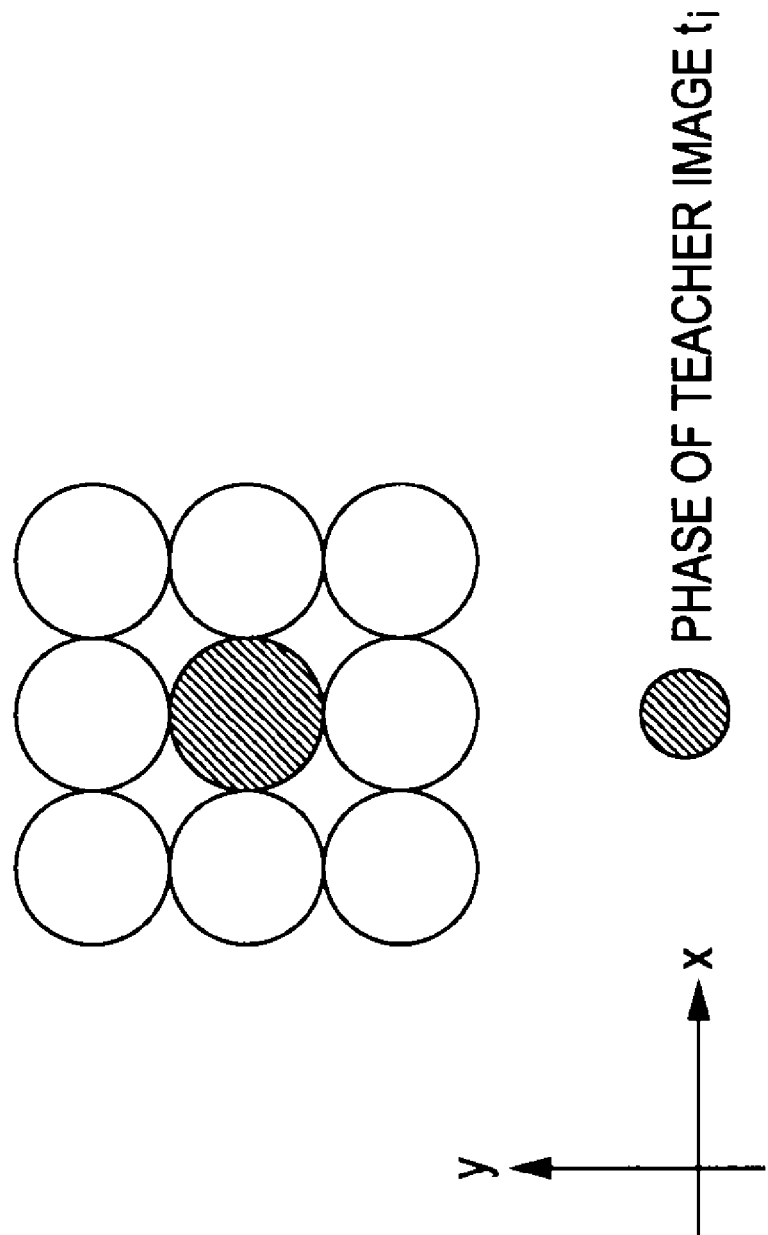
FIG. 17 illustrates an example of a class tap for a classification adaptive process of the related art.

Here, the image processing performed by the image processing apparatus of the related art is image processing by the classification adaptive process performed using a class tap shown in FIG. 17. That is, the image processing performed by the image processing apparatus of the related art is such that, with regard to an input image, a pixel indicated using a hatched circle in FIG. 17 is set as a pixel of interest, a 1-bit ADRC code based on the pixel values of the 9 (=3×3) pixels is calculated, and classification is performed for each 1-bit ADRC code. The image processing of the related art employing a classification adaptive process has been disclosed in detail in, for example, Japanese Unexamined Patent Application Publication No. 7-79418.

In a case where a class tap shown in FIG. 17 is obtained and image processing based on a classification adaptive process of the related art is performed, each of the pixels of the input image is classified into one of 512 (=$2^9$) classes. In the learning apparatus 10 according to the embodiment of the present invention, in a case where learning of a discrimination coefficient is performed by performing nine iterations, each pixel of the input image is classified into one of 512 classes. As a consequence, in FIG. 17, the characteristic value of the image on which image processing by the image processing apparatus of the related art has been performed is written at the position corresponding to the nine iterations of the image processing by the image processing apparatus 100 according to the embodiment of the present invention. In practice, the number of iterations of the image processing performed by the image processing apparatus of the related art is only one (in the image processing by the classification adaptive process of the related art, iteration is not assumed from the very beginning).

Furthermore, in the image processing apparatus 100 according to the embodiment of the present invention, the linear feature amount shown in FIG. 2, to which the horizontal differentiation absolute values and the vertical differentiation absolute values of the pixel values in the surroundings of the pixel of interest, which are obtained on the basis of Expressions (3), the maximum value and the minimum value of the pixel values in the surroundings of the pixel of interest, and the maximum value of the horizontal differentiation absolute value sand the maximum value of the vertical differentiation absolute values, which are obtained on the basis of Expressions (4) are added as non-linear feature amounts, is set as a tap. In the image processing apparatus 100 according to the embodiment of the present invention, in a case where the value of the number of iterations p is set to 9, the number Nd of the types of the discrimination coefficient z and the number Nm of the types of the regression coefficient w are represented on the basis of Expression (20).

$$N_d = 2^p - 1 = 511$$

$$N_m = 2^p = 512 \quad (20)$$

In FIG. 16, an input image in which normal random number noise ($\sigma$=10.0) is contained is subjected to a high-quality image forming process by the image processing apparatus 100 according to the embodiment of the present invention and the image processing apparatus of the related art, respectively. For the evaluation expression of the value of the S/N ratio of FIG. 16, Expression (21) is used.

$$S/N[\text{dB}] = 20\log_{10}\left[255 \times \left(\sum_{i=1}^{N}(t_i - y_i)^2/N\right)^{-\frac{1}{2}}\right] \quad (21)$$

As shown in FIG. 16, when compared to the method of the related art, regarding the characteristics of the image on which image processing by the present invention has been performed, the value of the S/N ratio is improved by approximately 1 dB.

Figure 18:
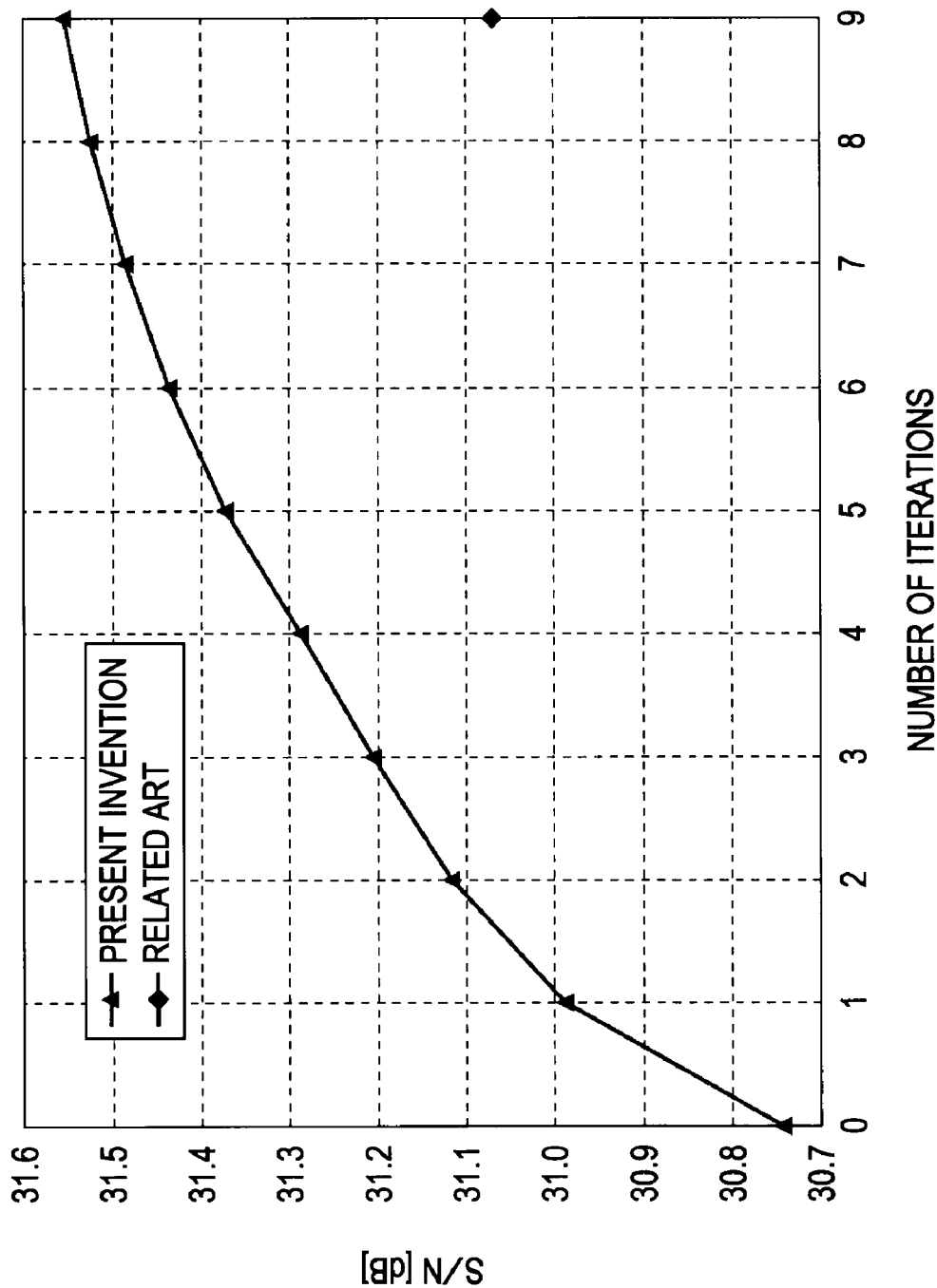
FIG. 18 illustrates advantages of a high-quality image forming process using the learning apparatus and the image processing apparatus according to the embodiment of the present invention.

FIG. 18 also illustrates advantages of the high-quality image forming process using the learning apparatus 10 and the image processing apparatus 100 according to the embodiment of the present invention.

Similarly to the case of FIG. 16, in FIG. 18, learning of a discrimination coefficient and the number of iterations of discrimination prediction are plotted along the horizontal axis, and the S/N ratio is plotted along the vertical axis. FIG. 18 shows characteristics of an image obtained by performing image processing by the image processing apparatus 100 according to the embodiment of the present invention or the image processing apparatus of the related art on an input image, which is an image in which noise is added. Points plotted using triangular symbols in FIG. 18 indicate characteristics of the image obtained by performing image processing by the image processing apparatus 100 according to the embodiment of the present invention. Points plotted using rhombic symbols in FIG. 18 indicate characteristics of the image obtained by performing image processing by the image processing apparatus of the related art.

Here, the image processing by the image processing apparatus of the related art is the same as that of the case described above with reference to FIG. 17. Furthermore, in the image processing apparatus 100 according to the embodiment of the present invention, an element identical to that of the case of FIG. 16 is used as a tap.

In FIG. 18, an input image in which spatial blur deterioration ($\sigma$=1.5) in the form of a regular distribution is contained is subjected to a high-quality image forming process by the image processing apparatus 100 according to the embodiment of the present invention and the image processing apparatus of the related art, respectively. For the evaluation expression of the value of the S/N ratio in FIG. 18, Expression (21) is used.

As shown in FIG. 18, when compared to the method of the related art, regarding the characteristics of the image on which image processing by the present invention has been performed, the value of the S/N ratio is improved by approximately 0.5 dB.

Figure 19:
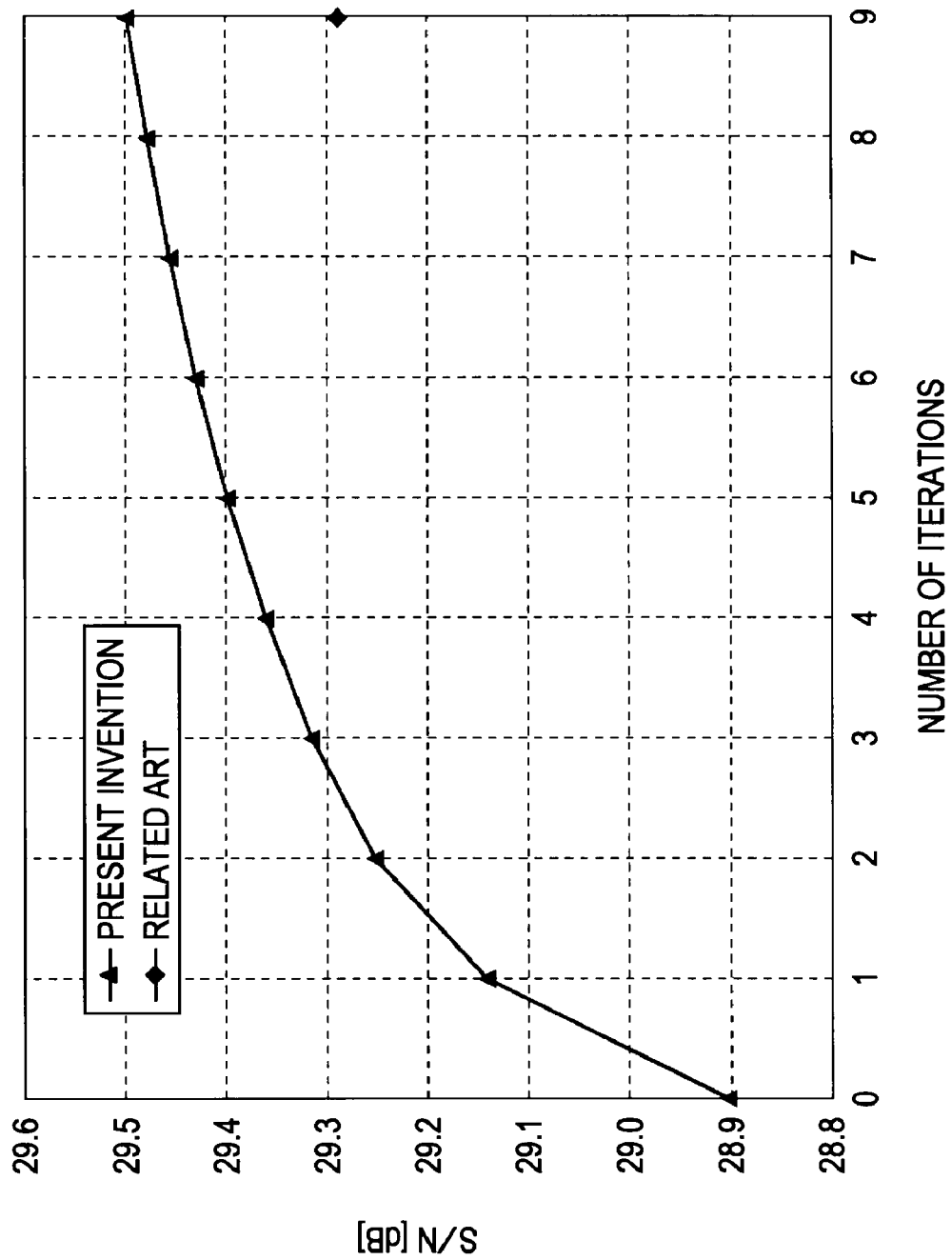
FIG. 19 illustrates advantages of a high-quality image forming process using the learning apparatus and the image processing apparatus according to the embodiment of the present invention.

FIG. 19 also illustrates advantages of a high-quality image forming process using the learning apparatus 10 and the image processing apparatus 100 according to the embodiment of the present invention.

Similarly to the case of FIG. 16, in FIG. 19, learning of a discrimination coefficient and the number of iterations of discrimination prediction are plotted along the horizontal axis, and the S/N ratio is plotted along the vertical axis. FIG. 19 shows characteristics of the image obtained by performing image processing by the image processing apparatus 100 according to the embodiment of the present invention or the image processing apparatus of the related art on an input image, which is an image in which noise is added. Points plotted using triangular symbols in FIG. 19 indicate characteristics of the image obtained by performing image processing by the image processing apparatus 100 according to the embodiment of the present invention. Points plotted using rhombic symbols in FIG. 19 indicate characteristics of the image obtained by performing image processing by the image processing apparatus of the related art.

Here, the image processing by the image processing apparatus of the related art is identical to that of the case described above with reference to FIG. 17. Furthermore, in the image processing apparatus 100 according to the embodiment of the present invention, an element identical to that of the case of FIG. 16 is used as a tap.

In FIG. 19, an input image that is reduced to ⅓ size in the horizontal/vertical direction in terms of space and band-deteriorated is subjected to a high-quality image forming process (in this case, a process for enlarging the image) by the image processing apparatus 100 according to the embodiment of the present invention and the image processing apparatus of the related art. That is, the example of FIG. 19 shows that a down-converted deteriorated image is up-converted (3×3 times). For the evaluation expression of the value of the S/N ratio in FIG. 19, Expression (21) is used.

As shown in FIG. 19, when compared to the method of the related art, regarding the characteristics of the image on which image processing by the present invention has been performed, the value of the S/N ratio is improved by approximately 0.2 dB.

As shown in FIGS. 16, 18 and 19, according to the embodiment of the present invention, it is possible to perform a high-quality image forming process more effective than in the related art.

That is, according to the embodiment of the present invention, in any one of the case of an input image in which normal random number noise ($\sigma$=10.0) is contained, the case of an input image in which spatial blur deterioration ($\sigma$=1.5) in the form of a regular distribution is contained, the case of an input image that is down-converted and degraded, it is possible to perform a high-quality image forming process more appropriately than the method of the related art. Furthermore, in addition to the examples shown in FIGS. 16, 18 and 19, it is possible to apply the present invention to various application programs related to making images have higher quality. For example, the present invention can be applied to application programs and the like for a high-quality image forming process, which are related to noise removal, coding distortion removal, blur removal, resolution creation, gradation creation, demosaicing, IP conversion, and the like.

Furthermore, according to the embodiment of the present invention, it is possible to appropriately perform a high-quality image forming process even in the case that there are plural deterioration causes of an image, such as noise removal, coding distortion removal, blur removal, . . . . For example, the present invention can appropriately apply a high-quality image forming process to even the case of an image containing noise, encoding distortion, and blur. Furthermore, in the embodiment of the present invention, even in the case that there are plural deterioration causes of an image in the manner described above, it is possible to appropriately perform a high-quality image forming process without increasing the number of elements and the number of types of discrimination coefficients z and regression coefficients w.

In the embodiment of the present invention, as described above, the linear feature amount shown in FIG. 2, to which the horizontal differentiation absolute values and the vertical differentiation absolute values of the pixel values in the surroundings of the pixel of interest, which are obtained on the basis of Expressions (3), and the maximum value and the minimum value the maximum value of the pixel values in the surroundings of the pixel of interest, and the maximum value of the horizontal differentiation absolute values and the maximum value of the vertical differentiation absolute values, which are obtained on the basis of Expressions (4), are added as non-linear feature amount, is used as a tap. A description will be given below, with reference to FIG. 20, of advantages in a high-quality image forming process in a case where a tap to which a non-linear feature amount is added is used.

Figure 20:
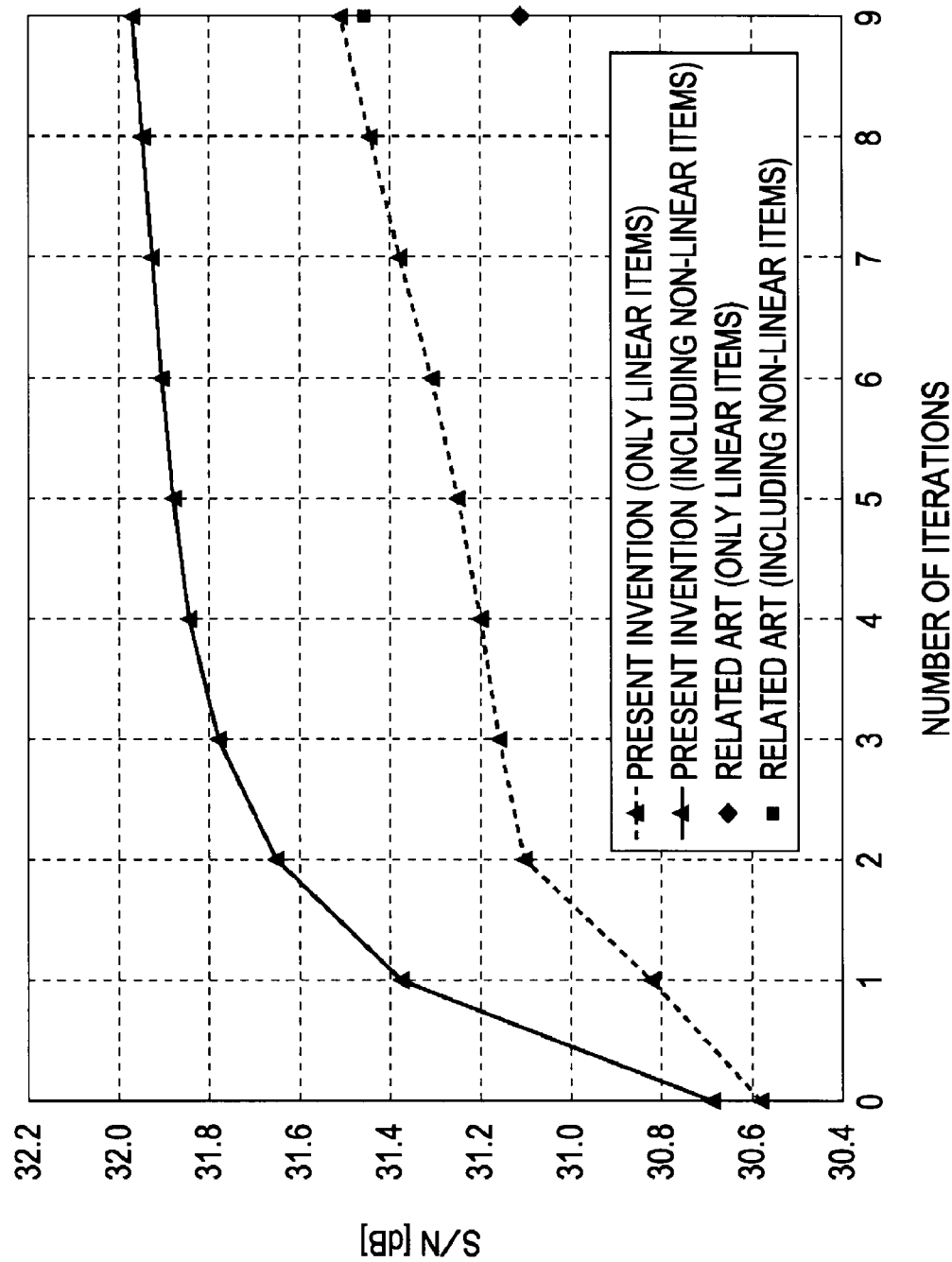
FIG. 20 illustrates advantages in the high-quality image forming process in a case where a tap to which a non-linear feature amount has been added is used.

FIG. 20 also shows advantages of a high-quality image forming process using the learning apparatus 10 and the image processing apparatus 100 according to the embodiment of the present invention.

Similarly to FIG. 16, in FIG. 20, learning of a discrimination coefficient and the number of iterations of discrimination prediction are plotted along the horizontal axis, and the S/N ratio is plotted along the vertical axis. FIG. 20 shows characteristics of an image obtained by performing image processing by the image processing apparatus 100 according to the embodiment of the present invention and an image processing apparatus of the related art on an input image, which is an image in which noise is added. Points plotted using triangular symbols in FIG. 20 indicate characteristics of an image obtained by performing image processing by the image processing apparatus 100 according to the embodiment of the present invention. Points plotted using rectangular (rhombic) symbols in FIG. 20 indicate characteristics of an image obtained by performing image processing by the image processing apparatus 100 of the related art.

Here, the image processing by the image processing apparatus of the related art is identical to that in the case described above with reference to FIG. 17. Furthermore, in the image processing apparatus 100 according to the embodiment of the present invention, an element identical to the case of FIG. 16 is used as a tap.

In FIG. 20, an input image containing normal random number noise ($\sigma$=10.0) is subjected to a high-quality image forming process by the image processing apparatus 100 according to the embodiment of the present invention and the image processing apparatus of the related art. For the evaluation expression of the value of the S/N ratio of FIG. 20, Expression (21) is used. The dotted line in FIG. 20 indicates characteristics of an image obtained by a high-quality image forming process performed by the image processing apparatus 100 according to the embodiment of the present invention using only a linear feature amount obtained from the student image shown in FIG. 2. Furthermore, the solid line of FIG. 20 indicates the characteristics of an image obtained by the high-quality image forming process performed by the image processing apparatus 100 according to the embodiment of the present invention using a tap such that the horizontal differentiation absolute values and the vertical differentiation absolute values of the pixel values in the surroundings of the pixel of interest, which are obtained on the basis of Expressions (3), and the maximum value and the minimum value of the pixel values in the surroundings of the pixel of interest, the maximum value of the horizontal differentiation absolute values and the maximum value of the vertical differentiation absolute values, which are obtained on the basis of Expressions (4) are added as non-linear feature amounts to the linear feature amount obtained from the student image shown in FIG. 2.

As shown in FIG. 20, when compared to the case in which a tap of only the linear feature amount is used, regarding the characteristics of the image on which a high-quality image forming process using a tap to which a non-linear feature amount has been added is performed, the value of the S/N ratio is improved by approximately 0.5 dB.

Furthermore, points plotted using rhombuses of FIG. 20 indicate characteristics of an image obtained by the high-quality image forming process performed by the image processing apparatus of the related art using a tap of only the linear feature amount shown in FIG. 17. Furthermore, points plotted using rectangles of FIG. 20 indicate characteristics of an image obtained by the high-quality image forming process performed by the image processing apparatus of the related art using a tap such that the horizontal differentiation absolute values and the vertical differentiation absolute values of the pixel values in the surroundings of the pixel of interest, which are obtained on the basis of Expressions (3), and the maximum value and the minimum value of the pixel values in the surroundings of the pixel of interest, the maximum value of the horizontal differentiation absolute values, and the maximum value of the vertical differentiation absolute values, which are obtained on the basis of Expressions (4), are added as non-linear feature amounts to the linear feature amount shown in FIG. 17.

As shown in FIG. 20, also, in the method of the related art, when compared to the case in which a tap of only the linear feature amount is used, regarding the characteristics of the image on which a high-quality image forming process using a tap to which a non-linear feature amount has been added has been performed, the value of the S/N ratio is improved by approximately 0.4 dB.

In a case where a high-quality image forming process using a tap to which a non-linear feature amount is added is applied to a classification adaptive process of the related art, for example, the following process is performed.

In an input image, with regard to a class tap, a tap shown in FIG. 17 is obtained in the same manner as in the case in which a tap of only the linear feature amount is used. For this reason, a 1-bit ADRC (Adaptive Dynamic Range Coding) code based on nine elements is calculated, and the pixel of interest is classified for each calculated 1-bit ADRC code.

Furthermore, for the prediction tap, the linear feature amount obtained from the student image shown in FIG. 2, to which the horizontal differentiation absolute values and the vertical differentiation absolute values of the pixel values in the surroundings of the pixel of interest, which are obtained on the basis of Expressions (3), and the maximum value and the minimum value of the pixel values in the surroundings of the pixel of interest, and the maximum value of the horizontal differentiation absolute values and the maximum value of the vertical differentiation absolute values, which are obtained on the basis of Expressions (4) are added as non-linear feature amounts, is used. By multiplying the regression coefficient w by each of the elements of the tap, the prediction value with which the above-described regression computation has been performed is computed with reference to Expression (2). Then, an output image in which the obtained prediction value is the value of the pixel corresponding to the pixel of interest is generated. As a result, an output image in which the input image has been made to have higher quality is obtained. Regarding the characteristics of the output image, as described above, the value of the S/N ratio is improved when compared to the case in which a tap of only the linear feature amount is used.

The above-described series of processing operations can be performed by hardware and can also be performed by software. In a case where the above-described series of processing operations is to be performed by software, the program forming the software is installed from a network or a recording medium to a computer incorporated in dedicated hardware or to a general-purpose personal computer 700 shown in, for example, FIG. 21, which is capable of executing various functions by installing various kinds of programs.

Figure 21:
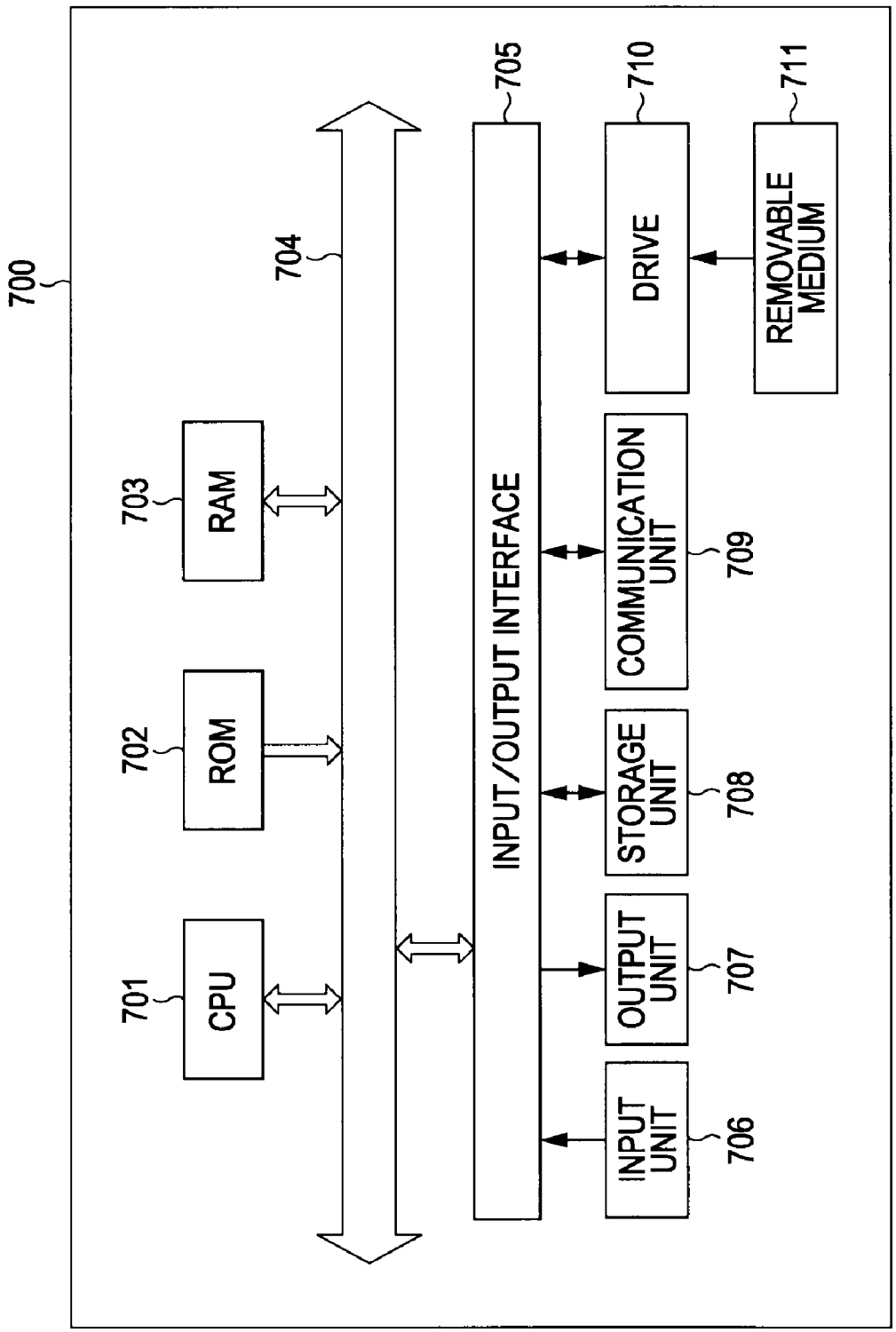
FIG. 21 is a block diagram showing an example of the configuration of a personal computer.

In FIG. 21, a CPU (Central Processing Unit) 701 executes various kinds of processing operations in accordance with a program stored in a ROM (Read Only Memory) 702 or in accordance with a program loaded from a storage unit 708 to a RAM (Random Access Memory) 703. In the RAM 703, also, data and the like necessary for the CPU 701 to execute various kinds of processing operations is stored as appropriate.

The CPU 701, the ROM 702, and the RAM 703 are interconnected with one another via a bus 704. Furthermore, an input/output interface 705 is also connected to the bus 704.

An input unit 706, an output unit 707, a storage unit 708, and a communication unit 709 are connected to the input/output interface 705. The input unit 706 includes a keyboard, a mouse, and the like. The output unit 707 includes a display unit formed of a CRT (Cathode Ray Tube) or an LCD (Liquid Crystal display), a speaker, and the like. The storage unit 708 includes a hard disk. The communication unit 709 includes a modem, a network interface card such as a LAN card, and the like. The communication unit 709 performs a communication process via a network including the Internet.

Furthermore, a drive 710 is connected to the input/output interface 705 as necessary. A removal medium 711, such as a magnetic disk, an optical disc, a magneto-optical disc, or a semiconductor memory, is loaded into the drive 710 as appropriate. A computer program read from the drive 710 is installed into the storage unit 708 as necessary.

In a case where the above-described series of processing operations is to be executed by software, the program forming the software is installed from a network such as the Internet or from a recording medium formed from the removal medium 711.

The recording medium may be formed of a removable medium 711 composed of a magnetic disk (including a floppy disk) (registered trademark), an optical disc (including a CD-ROM (Compact Disc-Read Only Memory), a DVD (Digital Versatile Disc), or a magneto-optical disc (including an MD (Mini-disk) (registered trademark)), or a semiconductor memory, in which a program is recorded, the recording medium being distributed to provide the program to the user separately from the main unit of the apparatus shown in FIG. 21. In addition, the recording medium may be formed of the ROM 702 and the hard disk contained in the storage unit 708, in which a program is recorded, which are provided to the user by being incorporated in advance into the main unit of the apparatus.

In the present specification, the above-described series of processing operations may include processing operations that are performed in a time-series manner along the written order and may also include processing operations that are performed concurrently or individually although they are not performed in a time-series manner.

The present application contains subject matter related to that disclosed in Japanese Priority Patent Application JP 2008-250229 filed in the Japan Patent Office on Sep. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   storage means in which regression coefficient data is stored for each class on the basis of a tap in which a linear feature amount corresponding to a pixel of interest of first image data of an input first image and a non-linear feature amount determined from the first image data of the input first image are used as elements;
   classification means for classifying each of linear feature amounts of a plurality of items of the first image data of the input first image into a predetermined class;
   reading means for reading, from the storage means, the regression coefficient data corresponding to the class determined by the classification means; and
   data generation means for generating data of a second image obtained by making the input first image have higher quality by performing a product-sum computation process by using the regression coefficient data read from the reading means and elements of the tap of each of the plurality of items of the first image data of the input first image.

2. The image processing apparatus according to claim 1, wherein the non-linear feature amounts are horizontal and vertical differentiation absolute values at the positions of pixels in the surroundings of the pixel of interest.

3. The image processing apparatus according to claim 1, wherein the non-linear feature amounts are maximum and minimum values of the pixels in the surroundings of the pixel of interest.

4. The image processing apparatus according to claim 1, wherein the non-linear feature amounts are maximum values of the horizontal and vertical differentiation absolute values at the positions of pixels in the surroundings of the pixel of interest.

5. The image processing apparatus according to claim 1, further comprising:
  discrimination prediction means for performing discrimination prediction computation that obtains a discrimination prediction value for identifying a discrimination class to which the pixel of interest belongs through a product-sum computation of each of the linear feature amounts corresponding to the pixel of interest of the first image data and a prestored discrimination coefficient, wherein, on the basis of the discrimination prediction value, the classification means classifies each of the pixels of interest of the image of the first signal into a predetermined class.

6. An image processing apparatus comprising:
  a storage unit in which regression coefficient data is stored for each class on the basis of a tap in which a linear feature amount corresponding to a pixel of interest of first image data of an input first image and a non-linear feature amount determined from the first image data of the input first image are used as elements;
  a classification unit configured to classify each of linear feature amounts of a plurality of items of the first image data of the input first image into a predetermined class;
  a reading unit configured to read, from the storage unit, the regression coefficient data corresponding to the class determined by the classification unit; and
  a data generation unit configured to generate data of a second image obtained by making the input first image have higher quality by performing a product-sum computation process by using the regression coefficient data read from the reading unit and elements of the tap of each of the plurality of items of the first image data of the input first image.

* * * * *